(12) United States Patent
Ota et al.

(10) Patent No.: US 11,810,286 B2
(45) Date of Patent: Nov. 7, 2023

(54) DISPLAY CONTROL DEVICE AND STORAGE MEDIUM

(71) Applicant: SINTOKOGIO, LTD., Nagoya (JP)

(72) Inventors: Kazuhiro Ota, Toyokawa (JP); Takeshi Sonohara, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 286 days.

(21) Appl. No.: 17/213,361

(22) Filed: Mar. 26, 2021

(65) Prior Publication Data

US 2021/0304392 A1  Sep. 30, 2021

(30) Foreign Application Priority Data

Mar. 30, 2020 (JP) .................................. 2020-061042
Feb. 24, 2021 (JP) .................................. 2021-027727

(51) Int. Cl.
*G06T 7/00* (2017.01)
*G06F 3/14* (2006.01)
(Continued)

(52) U.S. Cl.
CPC .............. *G06T 7/0004* (2013.01); *G06F 3/14* (2013.01); *G06T 3/40* (2013.01); *G06T 7/62* (2017.01); *G06T 7/73* (2017.01); *G06T 11/001* (2013.01); *G06V 10/245* (2022.01); *G06V 10/987* (2022.01); *G09G 5/38* (2013.01); *G06T 2207/30116* (2013.01); *G06T 2207/30204* (2013.01); *G09G 2354/00* (2013.01)

(58) Field of Classification Search
CPC ... B22F 3/1055; B33Y 10/00; G01N 21/8921; G01N 21/8851; G01N 21/8803; G06T 7/0008; G06T 7/0006; G06T 17/00; H04N 5/23203; G06V 10/7747; G01M 11/0278
See application file for complete search history.

(56) References Cited

U.S. PATENT DOCUMENTS 4,409,718 A 10/1983 Pryor
5,075,051 A 12/1991 Ito et al.
(Continued)

FOREIGN PATENT DOCUMENTS

CN 105452806 A 3/2016
CN 111161224 A 5/2020
(Continued)

OTHER PUBLICATIONS

U.S. Office Action for corresponding U.S. Appl. No. 17/213,383 dated Sep. 1, 2022.
(Continued)

*Primary Examiner* — Phuoc H Doan
(74) *Attorney, Agent, or Firm* — Harness, Dickey & Pierce, P.L.C.

(57) ABSTRACT

Provided is the technique that allows an operator or the like to easily grasp a defect contained in a mold. A display control device is configured to carry out: a determination process in which a feature amount of each of defects contained in a mold is determined with reference to an image obtained by image capture of a mold; and a display process in which the image is displayed on a display such that each of the defects in the image is emphasized by a method which is determined according to the determined feature amount.

9 Claims, 13 Drawing Sheets

(51) Int. Cl.
*G06T 11/00* (2006.01)
*G06T 7/73* (2017.01)
*G06T 3/40* (2006.01)
*G09G 5/38* (2006.01)
*G06T 7/62* (2017.01)
*G06V 10/98* (2022.01)
*G06V 10/24* (2022.01)

(56) References Cited

U.S. PATENT DOCUMENTS

| | | | |
|---|---|---|---|
| 5,697,424 | A | 12/1997 | Ferdinandsen et al. |
| 6,615,159 | B1 | 9/2003 | Nishida |
| 6,661,507 | B2 | 12/2003 | Yoda et al. |
| 2005/0225753 | A1 | 10/2005 | Engelbart et al. |
| 2007/0204555 | A1 | 9/2007 | Engelbart et al. |
| 2014/0336806 | A1 | 11/2014 | Bewlay et al. |
| 2016/0041092 | A1 | 2/2016 | Urano et al. |
| 2016/0252619 | A1 | 9/2016 | Markendorf et al. |
| 2016/0346979 | A1 | 12/2016 | Uchiyama |
| 2017/0014945 | A1 | 1/2017 | Fraser et al. |
| 2017/0165891 | A1* | 6/2017 | Shiraishi ............. B29C 45/1769 |
| 2018/0207716 | A1 | 7/2018 | Larsen et al. |
| 2019/0247917 | A1 | 8/2019 | Nishida et al. |
| 2019/0258225 | A1 | 8/2019 | Link et al. |
| 2019/0385116 | A1 | 12/2019 | Vosshenrich |
| 2020/0234419 | A1 | 7/2020 | Ota et al. |
| 2021/0001399 | A1 | 1/2021 | Bullied et al. |

FOREIGN PATENT DOCUMENTS

| | | | |
|---|---|---|---|
| CN | 111929309 | A | 11/2020 |
| DE | 19542640 | A1 | 5/1996 |
| DE | 102006009320 | A1 | 9/2007 |
| DE | 202019004266 | U1 | 11/2019 |
| EP | 3315281 | A1 | 5/2018 |
| EP | 3632650 | A1 | 4/2020 |
| EP | 3736064 | A1 | 11/2020 |
| JP | H05169244 | A | 7/1993 |
| JP | 9-311031 | | 12/1997 |
| JP | 2000-131242 | A | 5/2000 |
| JP | 2004-144556 | A | 5/2004 |
| JP | 2004/198436 | A | 7/2004 |
| JP | 2004-334631 | A | 11/2004 |
| JP | 2007-532910 | A | 11/2007 |
| JP | 2010-139461 | A | 6/2010 |
| JP | 2010-223810 | A | 10/2010 |
| JP | 2012-045563 | A | 3/2012 |
| JP | 2013-43185 | A | 3/2013 |
| JP | 2018-040767 | A | 3/2018 |
| JP | 2018/075830 | A | 5/2018 |
| JP | 2018-520009 | A | 7/2018 |
| JP | 2019-148497 | A | 9/2019 |
| JP | 2019-196964 | A | 11/2019 |
| JP | 2019-215932 | A | 12/2019 |
| JP | 2019-217506 | A | 12/2019 |
| JP | 2020-508275 | A | 3/2020 |
| KR | 0933697 | B1 | 12/2009 |
| KR | 2010-0124653 | A | 11/2010 |
| KR | 2090103 | B1 | 3/2020 |
| WO | WO-2017/085765 | A1 | 5/2017 |
| WO | WO-2018/216495 | A1 | 11/2018 |
| WO | WO-2020/003888 | A1 | 1/2020 |

OTHER PUBLICATIONS

Japanese Office Action and English translation thereof for JP2020-061041 dated Feb. 7, 2023.
Japanese Office Action and English translation thereof for JP2020-061043 dated Feb. 7, 2023.
U.S. Office Action for corresponding U.S. Appl. No. 17/213,383 dated Feb. 2, 2023.
Japanese Office Action and English machine translation thereof for Japanese Application No. 2020-061041 dated May 9, 2023.
U.S. Office Action for corresponding U.S. Appl. No. 17/213,381 dated Apr. 11, 2023.
Japanese Office Action and English translation thereof for Japanese Application No. 2020-061043 dated Jul. 4, 2023.
U.S. Office Action for corresponding U.S. Appl. No. 17/213,377 dated May 11, 2023.

* cited by examiner

| Pattern code | Reference image folder No. |
|---|---|
| ... | ... |
| 10 | S10 |
| 11 | S11 |
| ... | ... |
| ... | ... |

FIG. 5

| Mold ID | Pattern code | Date and time of inspection | Inspection result | |
|---|---|---|---|---|
| | | | Evaluation | Inspection result image folder No. |
| 1001 | 10 | 2019.12.01 10:30:00 | Good | K1 |
| 1002 | 11 | 2019.12.01 10:30:30 | Good | K2 |
| 1003 | 10 | 2019.12.01 10:31:00 | Good | K3 |
| 1004 | 11 | 2019.12.01 10:31:30 | No good | K4 |
| ... | ... | ... | ... | ... |
| ... | ... | ... | ... | ... |

FIG. 6

| Mold ID | Pattern code | Position | Mold inspection result | | ... |
|---|---|---|---|---|---|
| | | | Evaluation | Pouring permission/non-permission | ... |
| 1001 | 10 | P19 | Good | Permission | ... |
| 1002 | 11 | P18 | Good | Permission | ... |
| 1003 | 10 | P17 | Good | Permission | ... |
| 1004 | 11 | P16 | No good | Non-permission | ... |
| ... | ... | ... | ... | ... | ... |
| ... | ... | ... | ... | ... | ... |

DISPLAY CONTROL DEVICE AND STORAGE MEDIUM

This Nonprovisional application claims priority under U.S.C. § 119 on Patent Application No. 2020-061042 filed in Japan on Mar. 30, 2020, and Patent Application No. 2021-027727 filed in Japan on Feb. 24, 2021, the entire contents of which are hereby incorporated by reference.

TECHNICAL FIELD

The present invention relates to a display control device and a storage medium.

BACKGROUND ART

In casting, the technique of inspecting molds for failures has been proposed. For example, Patent Literature 1 discloses detecting the width of a possible gap between adjacent sand mold parts, mold expansion, and mold dimensions to assess whether or not an actual situation is acceptable. Patent Literature 1 also proposes the technique of inspecting produced castings for failures. Patent Literature 2 discloses that an abnormal ingot position of an ingot is calculated based on information on molten metal to be solidified in a mold, and the abnormal ingot position is communicated to a subsequent continuous step. Patent Literature 3 discloses that images related to the name of a mold during casting, which is the pre-processing step, and to the name and shape of a mold during shakeout are displayed by a display means installed in the post-processing step in which sprue separation or the other process is carried out.

CITATION LIST

Patent Literature

[Patent Literature 1]
Published Japanese Translation of PCT International Application, Tokuhyo, No. 2018-520009
[Patent Literature 2]
Japanese Patent Application Publication, Tokukai, No. 2013-43185
[Patent Literature 3]
Japanese Patent Application Publication, Tokukaihei, No. 05-169244

SUMMARY OF INVENTION

Technical Problem

The techniques disclosed in Patent Literatures 1 to 3, in some cases, make it impossible for the operator to easily grasp in which part of a mold a failure has occurred. For example, in a case where a detected mold drop part of the mold is small, an image showing the detected mold drop is small correspondingly. In this case, the operator cannot grasp, at a glance, in which part there is a mold drop.

It is an object of an aspect of the present invention to provide the technique which allows an operator or the like to easily grasp a defect contained in a mold.

Solution to Problem

In order to solve the above-described problem, a display control device in accordance with an aspect of the present invention includes a controller, and the controller is configured to carry out: a determination process in which a feature amount of each of defects contained in a mold is determined with reference to an image obtained by image capture of a mold; and a display process in which the image is displayed on a display such that each of the defects contained in the mold is emphasized by a method which is determined according to the feature amount, determined in the determination process, of each of the defects contained in the mold.

Further, in order to solve the above-described problem, a computer-readable non-transitory storage medium in accordance with an aspect of the present invention stores a control program for controlling the display control device described in the above-described aspect, the control program causing the controller to carry out each of the foregoing processes.

Advantageous Effects of Invention

An aspect of the present invention allows an operator or the like to easily grasp a defect contained in a mold.

BRIEF DESCRIPTION OF DRAWINGS

FIG. 5 is a diagram illustrating an example of contents of an inspection result table in accordance with Embodiment 1 of the present invention.

FIG. 6 is a diagram illustrating an example of contents of a mold management table in accordance with Embodiment 1 of the present invention.

DESCRIPTION OF EMBODIMENTS

Embodiment 1

Figure 1:
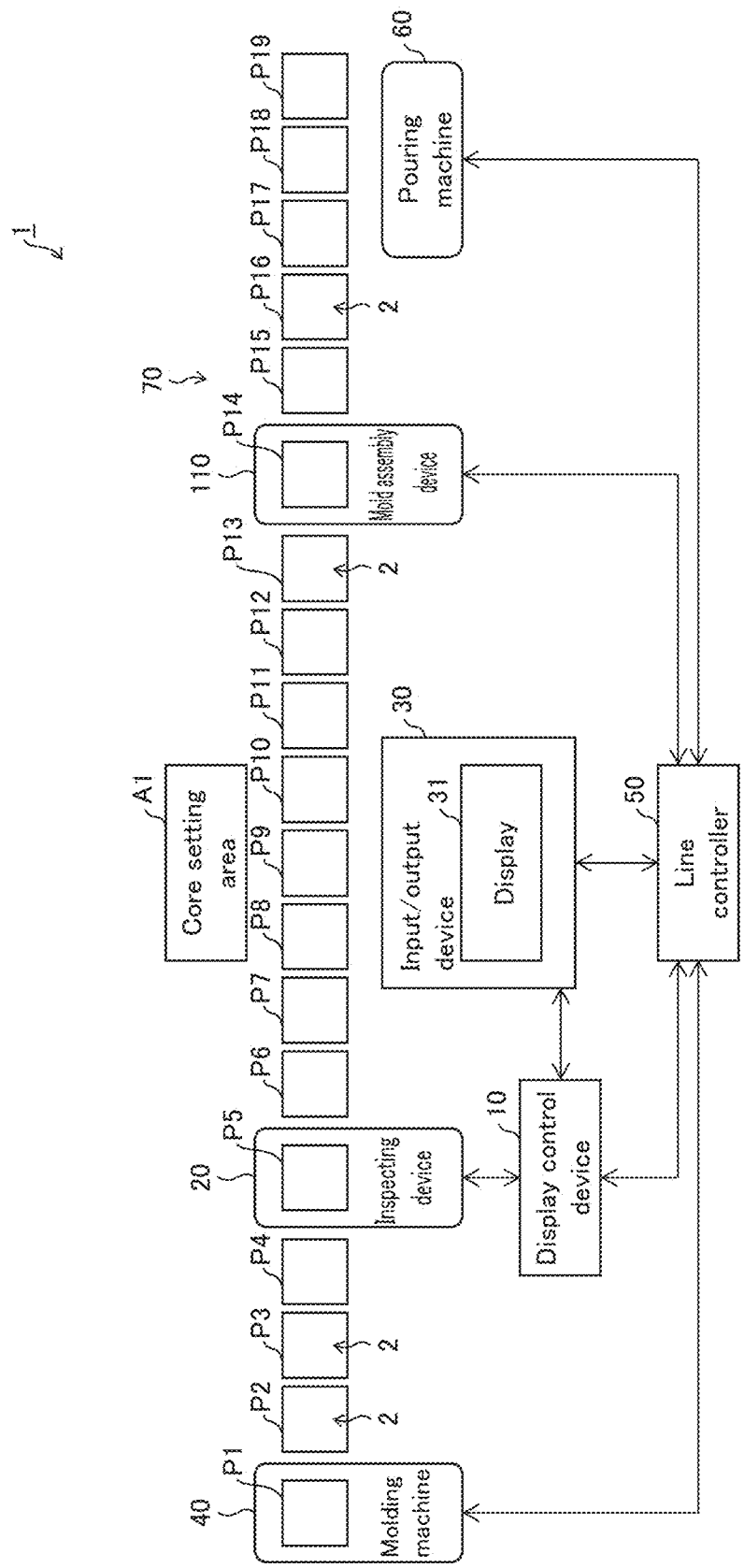
FIG. 1 is a diagram schematically illustrating a configuration of a casting system in accordance with Embodiment 1 of the present invention.

FIG. 1 is a diagram schematically illustrating a configuration of a casting system 1 that includes a display control device in accordance with an embodiment of the present invention. The casting system 1 is a system that produces castings by pouring molten metal into a plurality of molds 2 conveyed along a conveyance path. The casting system 1 includes a display control device 10, an inspecting device 20, an input/output device 30, a molding machine 40, a line controller 50, a pouring machine 60, a conveying device 70, and a mold assembly device 110.

The display control device 10 is a device that displays, on a display 31, an inspection result obtained by inspecting the molds 2 for failures during casting. The display control device 10 is, for example, a laptop or desktop personal computer. The display control device 10 may be a smart phone carried by an operator or a tablet terminal carried by the operator.

The inspecting device 20 is a device that inspects the molds 2 on the conveyance path. The inspecting device 20 includes a sensor 21 that captures respective images of the plurality of the molds 2 which are conveyed along the conveyance path. The sensor 21 is, for example, a camera. The sensor 21 captures an image of a product surface (cavity surface) of a flaskless mold before a cope and a drag conveyed along the conveyance path are assembled.

The display control device 10 carries out an inspection of the molds for defects by comparing an image thus captured (hereinafter referred to as "captured image") with a reference image, and then accumulates an inspection result in an inspection result table. The cope and the drag are conveyed alternately to a core setting area.

Figure 2:
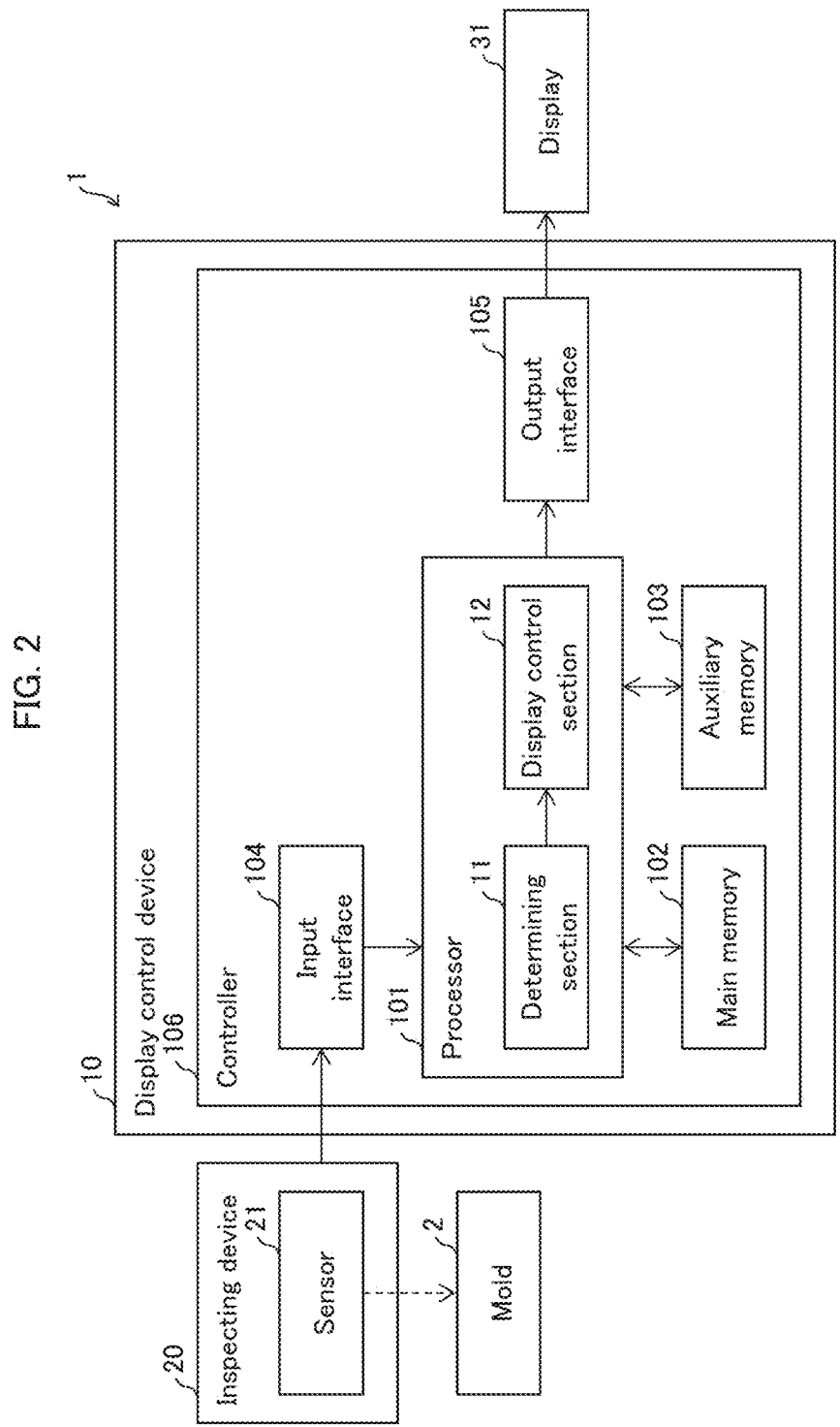
FIG. 2 is a block diagram schematically illustrating a configuration of a display control device 10 in accordance with Embodiment 1 of the present invention.

FIG. 2 is a block diagram schematically illustrating a configuration of the display control device 10. The display control device 10 includes a controller 106. The controller 106 includes a processor 101, a main memory 102, an auxiliary memory 103, an input interface 104, and an output interface 105. The processor 101 is a processor that controls the display control device 10, and is, for example, a processor such as a microprocessor, a digital signal processor, a microcontroller, or any combination of these processors. The main memory 102 and the auxiliary memory 103 (both of which are examples of a memory) are each, for example, a semiconductor random access memory (RAM). The main memory 102 and the auxiliary memory 103 may be an integral memory (physically one and the same memory) such that the main memory 102 and the auxiliary memory 103 are distinguished by region or by address in the same memory. The auxiliary memory 103 stores a program for causing the processor 101 to execute an operation of the display control device 10. The processor 101 causes a control program stored in the auxiliary memory 103 to be loaded in the main memory 102 and executes instructions contained in the loaded control program.

The main memory 102 mainly stores an application or software for mold drop evaluation. The auxiliary memory 103 stores reference image data to be referenced during inspection of the molds 2, an incoming captured image, display object data, and various other data. In the present embodiment, the auxiliary memory 103 stores a reference image table and the inspection result table. The reference image table is a table that stores, on a pattern by pattern basis, a reference image to be used when an inspection of the molds 2 is carried out. The inspection result table is a table that stores a result of a defect inspection of each of the molds 2 in association with identification information that identifies each of the molds 2.

The input interface 104 acquires the captured image from the inspecting device 20. The captured image thus acquired is stored in the auxiliary memory 103 in association with the identification information that identifies each of the molds 2. The output interface 105 outputs, to the display 31, data representing an image. Although one input interface 104 and one output interface 105 are illustrated in FIG. 2, the display control device 10 may include a plurality of input interfaces and/or a plurality of output interfaces. In this example, the processor 101 reads and executes the control program stored in the auxiliary memory 103, thereby realizing a determining section 11 and a display control section 12, which are illustrated in FIG. 2.

Figures 3, 4:
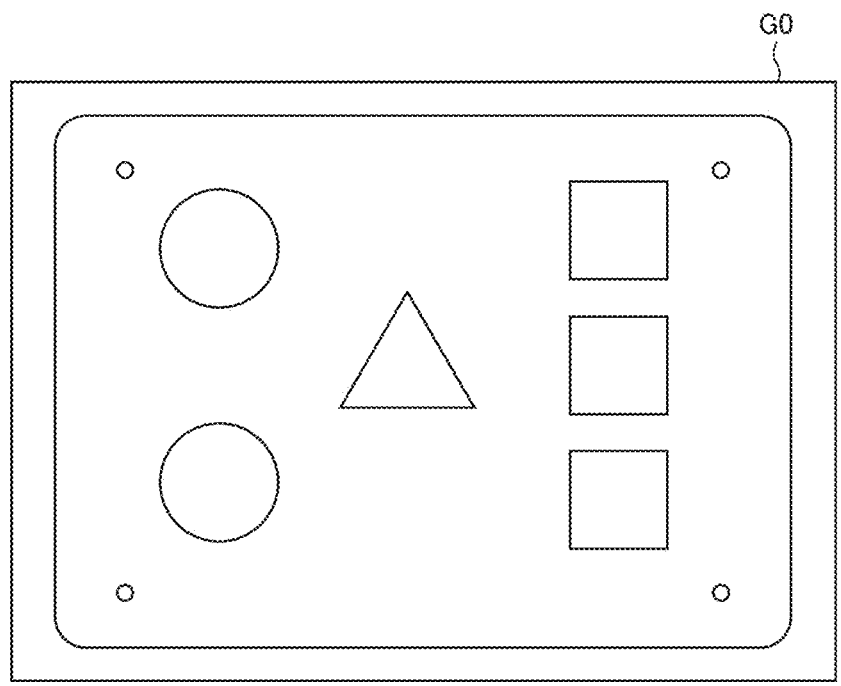
FIG. 3 is a diagram illustrating an example of contents of a reference image table in accordance with Embodiment 1 of the present invention.
FIG. 4 is a diagram illustrating an example of a reference image in accordance with Embodiment 1 of the present invention.

FIG. 3 is a diagram illustrating an example of contents of the reference image table. In the example illustrated in FIG. 3, the reference image table stores items of "pattern code" and "reference image folder No." in association with each other. Of these items, the item "pattern code" stores identification information (ID) that identifies a pattern. Pattern codes correspond to a certain pattern used for formation of molds, i.e. molds formed with use of that pattern. Among the pattern codes, for example, "10" is an ID of a drag formed by a certain pattern, and "11" is an ID of a cope to be assembled with the drag. In other words, the pattern codes distinguish a cope and a drag of a certain pattern. Therefore, when mold formation is carried out by use of the same pattern, IDs of molds flowing in the molding line consecutively alternate between the cope ID "11" and the drag ID "10" (see FIG. 5).

The item "reference image folder No." stores information indicative of a storage location of data of a reference image corresponding to that pattern. Note that the items contained in the reference image table are not limited to those described above, and other items may be contained in the reference image table. The reference image is an image obtained by capturing an image of a mold 2 formed without defects from above. By comparison between this reference image and the captured image, a check is made on the formed mold 2 for detects. In a case where a pattern code of a mold formed based on a certain pattern is "10" (drag), the display control device 10 determines the presence or absence of a defect by comparison between a reference image corresponding to "S10" as the "reference image folder No." and the captured image. Subsequently, since a mold 2 corresponding to a pattern code "11" (cope) is conveyed, the display control device 10 determines the presence or absence of a defect by comparison between a reference image stored in the reference image folder "S11" as "reference image folder No." and the captured image. The reference image table in FIG. 3 has a data structure for making a determination as to the presence or absence of a defect by such comparison between images.

FIG. 4 is a diagram illustrating an example of a reference image G0. The reference image G0 is prepared in advance and stored in the auxiliary memory 103. The reference image G0 is, for example, an image captured of a defect-free mold 2 by the inspecting device 20.

FIG. 5 is a diagram illustrating an example of contents of the inspection result table. In the example illustrated in FIG. 5, the inspection result table stores the items of "mold ID", "pattern code", "date and time of inspection", and "inspection result" in association with each other. Of these items, the item "mold ID" stores identification information that identifies a mold 2. IDs stored in the item "pattern code" are the same as the IDs stored in the "pattern code" in the reference image table described above. The item "date and time of inspection" stores information that indicates the date and time when a defect inspection was carried out. The item "inspection result" stores information that indicates a result of a defect inspection.

The item "inspection result" includes items of "evaluation" and "inspection result image folder No". The item "evaluation" stores information that indicates an evaluation result of a defect inspection. The evaluation of the defect inspection is carried out by comparison between a reference image and a captured image which are stored in the auxiliary memory 103, and is performed by the program of the display control device 10. As described above, the data table in FIG. 5 is stored in the auxiliary memory 103 of the display control device 10. The information indicating the evaluation result is, for example, "GOOD", "NO GOOD", or "FAIL". "GOOD" indicates that the mold 2 is normal. "NO GOOD" indicates that the mold 2 is abnormal (has a defect). "FAIL" indicates that the inspection itself failed. The item "inspection result image folder No." stores information that indicates a storage location of an image (hereinafter referred to as "inspection result image") representing the result of the defect inspection of the mold 2. As described above, the auxiliary memory 103 of the display control device 10 stores the result of the inspection of the mold 2 in association with the identification information that identifies the mold 2. Note that the items contained in the inspection result table are not limited to those described above, and other items may be contained in the inspection result table. For example, the inspection result may contain data representing a defect of a mold. The data representing a defect of the mold is data that represents at least one of, for example, a position of a defect, a shape thereof, and a size thereof.

Referring back to FIG. 2, the display control device 10 includes the determining section 11 and the display control section 12. The determining section 11 carries out a determination process in which a size of each of defects contained in the mold 2 is determined with reference to a captured image obtained by image capture of the mold 2. The captured image is sequentially inputted to the input interface 104 and is stored in the auxiliary memory 103 by the processor 101. The determining section 11 makes comparison between the reference image and the captured image which are stored in the auxiliary memory 103, thereby determining the size of a defect and generating a superimposed image according to the size of the defect. The superimposed image thus generated is displayed on the display 31. Such a program is stored in the auxiliary memory 103, and the processor 101 carries out a sequence of operations for image processing in accordance with the program stored in the auxiliary memory 103. The size of the detect is, for example, an area of a defective part when a mold 2 is viewed from a predetermined direction (for example, when the mold 2 is viewed from above), a length of the defective part in a longer side direction or in a shorter side direction, or a sum of the length of the defective part in the longer side direction and the length of the defective part in the shorter side direction.

The display control section 12 carries out a display process in which the captured image is displayed on the display 31 such that each of the defects contained in the mold is emphasized by a method which is determined according to the size, determined in the determination process, of each of the defects. The determining section 11 compares the captured image with the reference image, localizes a defective part according to a result of the comparison, and determines a size of the defective part in relation to a threshold value. Further, the determining section 11 determines an object to be superimposed on the image according to a result of the size determination, generates a composite image in which the object is superimposed on the captured image, and then temporarily stores, in the memory, the composite image thus generated (in a state of waiting to be read). The composite image waiting to be read is displayed on the display 31 by being triggered by the line controller 50 at a timing at which the composite image is to be displayed (specifically, at a timing at which a mold for which a corresponding image is to be displayed comes to the core work area).

Displaying by the method which is determined according to the size of each of the defects means, for example, displaying in such a manner that an appearance of an image representing a defect (hereinafter referred to as "defect image") is changed depending on the size of each of the defects. The defect image is an image representing a defect and is displayed so as to be superimposed on the captured image. The defect image is, for example, a figure of a size equivalent to a size of a defect contained in a mold 2 (hereinafter referred to as "defect figure") or a marker that indicates the defect. The defect figure is, for example, a rectangular figure, an oval figure, or a circular figure. The marker is an image for giving the defect contained in the mold 2 prominence in the captured image. The marker is, for example, a frame image surrounding the defect, a balloon image indicating a defective part, or an arrow image indicating the defective part. The defect figure and the marker are examples of the defect image representing the defect. The appearance of the defect image includes, for example, the number of images contained in the defect image, the shape of the image(s), the color of the image(s), the position of the image(s), the size of the image(s), and a blinking pattern of the image(s).

The display control section 12 may carry out control such that a defect of a size satisfying a predetermined condition is displayed on a captured image by a first method, whereas a defect of a size not satisfying the predetermined condition is displayed on a captured image by a second method. More specifically, for example, the display control section 12 carries out control such that a defect of a size greater than a threshold value is displayed on the captured image by the first method, whereas a defect of a size not greater than the threshold value is displayed on the captured image by the second method. The first method is, for example, a method by which a defect figure representing the position and size of each defect is displayed, whereas the second method is, for example, a method by which the defect figure representing the position and size of each defect and a marker indicating the defect are displayed.

With the above configuration, in displaying an image obtained by image capture of a mold on the display 31, the display control device 10 displays, on the display 31, an image in which a defect contained in the mold is emphasized by the method which is determined according to the size of the defect. Thus, a screen displayed on the display 31 allows an operator to easily grasp what defect is contained in the mold.

Note that, although it is described in this embodiment that the inspecting device 20 and the display control device 10 are separate devices, the inspecting device 20 and the display control device 10 may be configured to be an integral device. That is, the inspecting device 20 may have a function related to the display control device 10. Further, the above-described display control device 10 may be realized by cooperation of a plurality of separate devices. For example, a first device including the determining section 11 and a second device including the display control section 12 may be configured to be separate devices.

Referring back to FIG. 1, the molding machine 40 is a device that produces molds 2. The molding machine 40 forms the cope and the drag alternately, and the conveying device 70 conveys the cope and the drag alternately. The molding machine 40 receives information on a mold 2 (hereinafter referred to as "mold information") from the line controller 50, and produces a mold 2 which is indicated by a pattern code included in the received mold information. The pattern code is information that uniquely represents a mold formation pattern. The molding machine 40 charges sand into a molding flask (not illustrated) which is set together with a pattern (not illustrated), and compacts the sand by pressing the sand in the molding flask. The molding machine 40 forms a mold 2 by removing the pattern from the compacted sand. Each time the molding machine 40 forms a mold 2, the molding machine 40 transmits mold feed information to the line controller 50. Each time the line controller 50 receives the mold feed information from the molding machine 40, the line controller 50 generates mold information, which will be described later, and registers the generated mold information in a mold management table.

The input/output device 30 is a device for an operator to carry out various operations. The input/output device 30 includes an operating section (not illustrated) which is operated by the operator and the display 31 on which the inspection result of the mold 2 is displayed. The input/output device 30 may include, in addition to the display 31, an input means or an input device. The input means or the input device is the one for allowing an operator who is present in the core setting area to provide an instruction as to whether or not to permit pouring. The operator who is present in the core setting area provides an instruction as to whether or not to permit pouring after the operator visually checks an imaging inspection result displayed on the display 31 and makes a judgment as to whether or not a defect is so severe that pouring should be stopped and whether a defect determined by an image evaluation is acceptable to an extent that pouring is permitted through the visual check and from the operator's experience. The input means is, for example, an OK/Cancel button, an OK/Cancel button displayed on a display or a touch panel, or the like. The input device is a device that inputs OK/Cancel by sound. In the example illustrated in FIG. 1, the input/output device 30 is installed in a core setting area A1.

The display 31 is, for example, a liquid crystal display, and shows a screen in accordance with data supplied from the display control device 10. The display 31 may be, for example, a display device installed in a core setting area of the mold 2, or may be, for example, a liquid crystal display which is included in a smartphone carried by the operator or in a tablet terminal carried by the operator. Alternatively, the display 31 may be a wearable computer such as a smart glass. Although, in the example illustrated in FIG. 1, the display control device 10 and the display 31 are separate devices, the display control device 10 may be configured to include the display 31.

The line controller 50 is a controller that carries out overall control of the casting system 1. In this embodiment, the line controller 50 controls, in particular, the molding machine 40, the pouring machine 60, and the conveying device 70. The position of a mold 2 flowing through the line is collectively managed by the line controller 50.

The pouring machine 60 is a device that pours molten metal into a mold 2. The pouring machine 60 pours molten metal (carries out pouring) into a mold 2, as a pouring target, located in the pouring area, in accordance with a control signal transmitted from the line controller 50. The pouring machine 60 determines whether or not pouring is permitted in accordance with a control signal received from the line controller 50. In a case where the pouring machine 60 determines that pouring is not permitted, the pouring machine 60 does not carry out pouring into the mold 2.

The conveying device 70 is a device that carries molds 2 from the molding machine 40 to the pouring machine 60. The conveying device 70 has, for example, a roller conveyor (not illustrated) or a rail (not illustrated) to sequentially convey a plurality of molds 2 along a conveyance path on the roller conveyor or the rail. The conveying device 70 carries each of the molds 2 in accordance with a control signal transmitted from the line controller 50.

The core setting area A1 is provided between the inspecting device 20 and the pouring machine 60. In the core setting area A1, an operator is present to set cores in molds 2.

Prior to the pouring, upper and lower flasks for the molds (the cope and the drag) having passed through the core setting area A1 are assembled by the mold assembly device 110 which assembles the upper and lower flasks. As a method of assembling the upper and lower flasks, for example, a method of lifting the upper flask, inverting the upper flask, and placing the upper flask on the lower flask is used.

The assembled upper and lower flasks are conveyed to the pouring area by the conveying device 70. When the assembled upper and lower flasks enter the pouring area, a determination as to whether or not pouring is permitted is made based on the mold management table (described later) in the line controller 50, prior to the pouring. In a case where either the cope or the drag is visually evaluated to be no good, the pouring machine 60 is controlled, based on the signal from the line controller 50, so as not to carry out pouring.

Note that although the case where the molding machine 40 alternately forms copes and drags has been described in the present embodiment, a method of forming molds is not limited to such a method. Alternatively, the molding machine 40 may be configured to form a cope and a drag at a time so that these two molds 2 are conveyed in groups of two (i.e., the cope and the drag are conveyed as a set). In this case, two molding machines 40 and two inspecting devices 20 are provided. Further, the conveying device 70 carries the molds 2 in groups of two.

In this case, the cope and the drag are subjected to image capture at once, the captured images of the cope and the drag are compared with two reference images at a time, and the results of the inspections of the cope and the drag are displayed on the display 31. An operator in charge of cores looks at these two images and judges whether or not to permit pouring.

The line controller 50 has the mold management table for managing mold information. The mold management table is stored in, for example, an auxiliary memory of the line controller 50. The mold information is information on a mold 2 and includes, for example, identification information that identifies the mold 2 and position information that indicates a position of the mold 2 on the conveyance path. That is, the mold management table stores the identification information of the mold 2 in association with the position information of the mold 2. FIG. 6 is a diagram illustrating an example of contents of the mold management table. The mold management table stores the mold information in which the items of, for example, "mold ID", "pattern code", "position", and "mold inspection result" are associated with each other. Of these items, the item "mold ID" stores identification information that identifies a mold 2. The item "pattern code" stores identification information that identifies a pattern (mold formation pattern) which is used to produce a mold 2 identified by the corresponding mold ID.

The item "position" stores information indicating the position of the mold 2 identified by the corresponding mold ID on the conveyance path (hereinafter referred to as "position information"). In this embodiment, positions P1 to P19 are set as the position of the mold 2 on the conveyance path. This position information, P, is sequentially incremented in the order from P1 to P19 when one mold 2 is formed by the molding machine 40 and then conveyed by one. The position P1 is located most upstream in a conveyance direction of the conveying device 70 and is followed by the position P2, the position P3, and the like position information, which are assigned to positions downstream of the position P1. The position P1 is a position at which mold formation is carried out by the molding machine 40. The positions P2 to P4 are positions between the molding machine 40 and the inspecting device 20. The position P5 is a position at which image capture is carried out by the inspecting device 20. The positions P6 to P17 are positions between the inspecting device 20 and the pouring machine 60. The position P9 is a position in front of the display 31. The position P18 is a position at which pouring of molten metal is carried out by the pouring machine 60. The position P19 is a position at which the molding flask containing the mold 2 into which the molten metal has been poured is taken out.

The conveying device 70 sequentially moves a plurality of molds 2 on the conveyance path, and outputs, each time the molds 2 are moved, a signal indicating that the movement is completed (hereinafter referred to as a "flask feed completion signal"). Each time a plurality of molds 2 are moved on the conveyance path, the line controller 50 updates the position information which is associated with the identification information of each of the molds 2. In this embodiment, each time the line controller 50 receives the flask feed completion signal from the conveying device 70, the "position information" included in the mold information, which is stored in the mold management table, is incremented by one, and new mold information is added to the mold management table. The position information indicating the position P1 is stored in "position" of the added mold information. Note that, when the molding flask at the position P19 is fed, it means that the molding flask will be taken out of the casting system 1.

That is, the line controller 50 generates new mold information when the mold 2 is formed. Further, when the mold 2 is ejected after the formation of the mold 2 is completed, the conveying device 70 moves one mold 2. Accordingly, all of the other molds 2 on the line are moved by one mold, and the position information (P1, P2, . . . , PN) of each of the molds 2 is incremented sequentially. The incremented position information is stored in the mold information table of the line controller 50. The line controller 50 keeps track of the locations of all of the molds 2 on the line from the position information stored in the mold management table.

The item "mold inspection result" includes items of "evaluation" and "pouring permission/non-permission". The item "evaluation" stores information that indicates an evaluation result of a defect inspection. The information stored in the item "evaluation" is the same as the information stored in the item "evaluation" in the inspection result table of the display control device 10.

The item "pouring permission/non-permission" stores information that indicates whether or not pouring is to be carried out (hereinafter referred to as "pouring permission/non-permission information"). In the present embodiment, an operator who sets cores makes a judgment as to whether or not to permit pouring into the mold 2, by visually checking an inspection result displayed on the display 31. To make a judgment as to whether or not to permit pouring into the mold 2, the operator assesses whether or not pouring into the mold 2 would cause a defect in a resulting casting, through visual check of the inspection result displayed on the display 31. The operator enters a result of the judgment by means of the input/output device 30. The input/output device 30 transmits the pouring permission/non-permission information to the line controller 50 in response to the operation of the operator. The line controller 50 causes the pouring permission/non-permission information received from the input/output device 30 to be stored in the item "pouring permission/non-permission" of the mold management table. The line controller 50 transmits a control signal to the pouring machine 60 in accordance with the information stored in the item "pouring permission/non-permission" of the mold management table. Note that the items contained in the mold management table are not limited to those described above, and other items may be contained in the mold management table.

(Operations)

Figure 7:
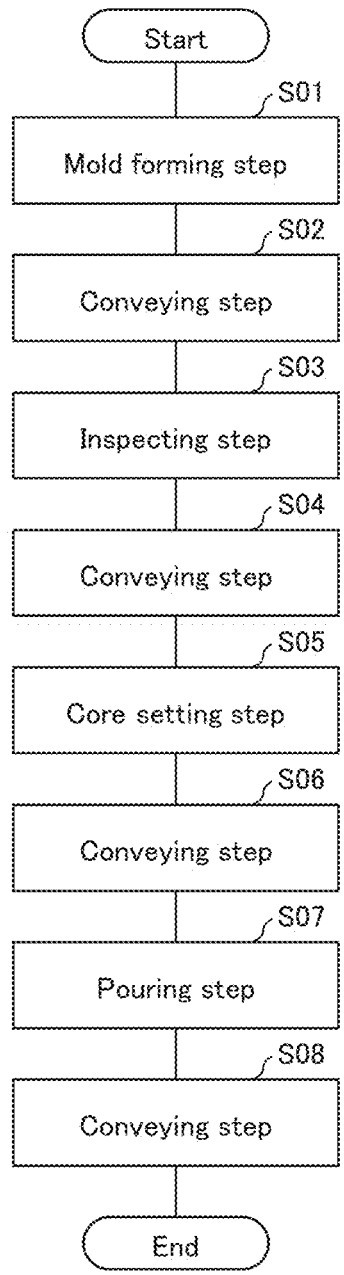
FIG. 7 is a process chart illustrating a production process of a casting in the casting system in accordance with Embodiment 1 of the present invention.

FIG. 7 is a process chart illustrating a production process of a casting in the casting system 1. In a mold forming step S01, the line controller 50 transmits a control signal for instructing the molding machine 40 to form a mold and the mold information of the position P. The molding machine 40 produces a mold 2 of the type indicated by a pattern code which is included in the mold data received from the line controller 50.

In a conveying step S02, the line controller 50 transmits, to the conveying device 70, a control signal for instructing the conveying device 70 to convey molds 2 by one pitch (hereinafter referred to as "conveyance instruction signal"). Each time the conveying device 70 receives the conveyance instruction signal from the line controller 50, the conveying device 70 carries out control to convey the mold 2 on the conveyance path one pitch at a time. When the conveyance of the mold 2 is completed, the conveying device 70 transmits the flask feed completion signal to the line controller 50. Each time the line controller 50 receives the flask feed completion signal from the conveying device 70, the line controller 50 updates position information contained in the mold information of the molds 2 on the conveyance path. The molds 2 on the conveyance path are moved one pitch at a time by the conveying device 70. By repeating such a movement, the mold 2 located at the position of the molding machine 40 is moved to the position of the inspecting device 20.

In an inspecting step S03, the sensor 21 of the inspecting device 20 performs image capture (imaging) of the mold 2 formed in the molding flask and located in the inspection area (position P5). The image captured by the sensor 21 is referenced to in the determination process in which the size of a defect of the mold 2 is determined. In this embodiment, the sensor 21 captures an image of the mold 2 having been moved to the position P5 from above the mold 2. An image capture range of the sensor 21 is preset such that an image of at least a surface (entire upper surface) of the mold 2 located at the position P5 is captured. The display control device 10 performs an inspection of the mold 2 with use of the pattern code which is contained in the mold information of the mold 2 located at the position P5 and generated data of the captured image.

The inspection of the mold 2 is performed, for example, in a manner as described below. The display control device 10 carries out a process in which a defective part is identified by generating a subtraction image that represents a difference between the image captured by the sensor 21 and the pre-registered reference image, and subjecting the generated subtraction image to particle analysis to detect a mass (blob) within the subtraction image.

The display control device 10 causes an inspection result to be stored in the auxiliary memory 103 of the display control device 10. The inspection result includes, for example, image data that represents the identified defective part. By repeating such a storage process, inspection results of a plurality of molds 2 are accumulated in the auxiliary memory 103.

In a conveying step S04, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 located at the position of the inspecting device 20 is moved to the core setting area A1.

In a core setting step S05, the display control device 10 causes an inspection result of a mold 2 formed in the molding flask and located at the position P9 to be displayed on the display 31. The display 31 keeps displaying the inspection result while the mold 2 is stopped in the core setting area A1. The operator in the core setting area A1 determines whether or not to set a core in the mold 2 in accordance with the inspection result, of that mold 2, displayed on the display 31. For example, the operator performs the following operation: The operator sets the core in the mold 2 which has been determined to be normal based on the inspection result, but does not set the core in the mold 2 which has been determined to be abnormal based on the inspection result. In addition to such an operation for setting the core, the operator performs a pouring permission/non-permission manipulation in which pouring is permitted in a case where the operator has assessed the mold 2 to be normal by visual check, and is not permitted in a case where the operator has assessed the mold 2 to be abnormal by visual check.

In a conveying step S06, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold 2 in the core setting area A1 is moved to the position of the pouring machine 60.

In a pouring step S07, the line controller 50 transmits, to the pouring machine 60, a control signal for providing an instruction to carry out pouring and the mold information.

The pouring machine 60 carries out pouring based on the pattern code contained in the mold information in accordance with the control signal received from the line controller 50. At this time, in a case where the mold 2 has been determined to be normal based on the inspection result, the line controller 50 transmits a control signal for instructing the pouring machine 60 to carry out pouring into the mold 2. On the other hand, in a case where the mold 2 has been determined to be abnormal based on the inspection result, the line controller 50 transmits a control signal for instructing the pouring machine 60 not to carry out pouring into the mold 2.

In a conveying step S08, the line controller 50 carries out the same process as in the conveying step S02 to convey the molds 2 on the conveyance path one pitch at a time. The molds 2 on the conveyance path are moved one pitch at a time by the conveying device 70. By repeating such a movement, the mold having been subjected to pouring at the position of the pouring machine 60 is taken out of the casting system 1.

As described above, in the casting system 1, the molding machine 40 produces the mold 2, and the inspecting device 20 inspects the mold 2. Then, the core is set in the mold 2 having been determined to be normal based on the inspection result, and thereafter, the pouring machine 60 carries out pouring into the mold 2 with the core set therein. Further, in the casting system 1, a plurality of molds 2 are conveyed in order from the position P1 to the position P19 by the conveying device 70. That is, the molding step S01 for one mold 2, the inspecting step S03 for another mold 2, and the core setting step S05 for still another mold 2, and the pouring step S07 for yet another mold 2 are carried out in parallel.

Figure 8:
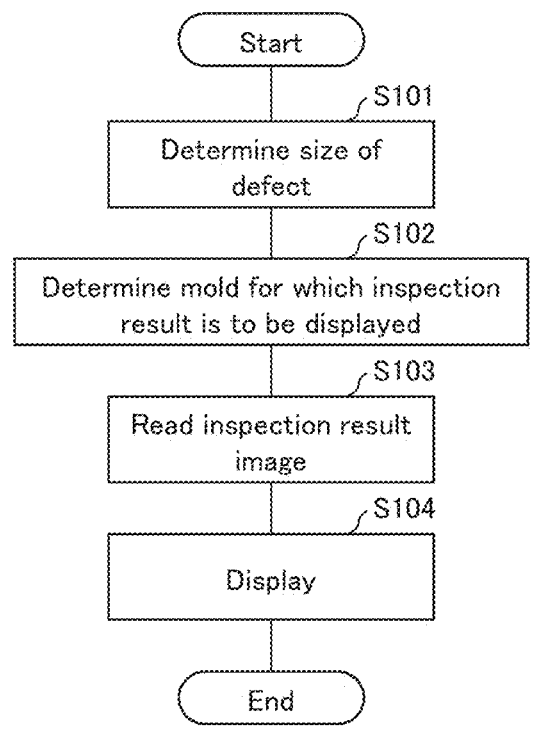
FIG. 8 is a flowchart illustrating an example of a flow of an inspection result display process carried out by a display control device and a line controller in accordance with Embodiment 1 of the present invention.
Figure 9:
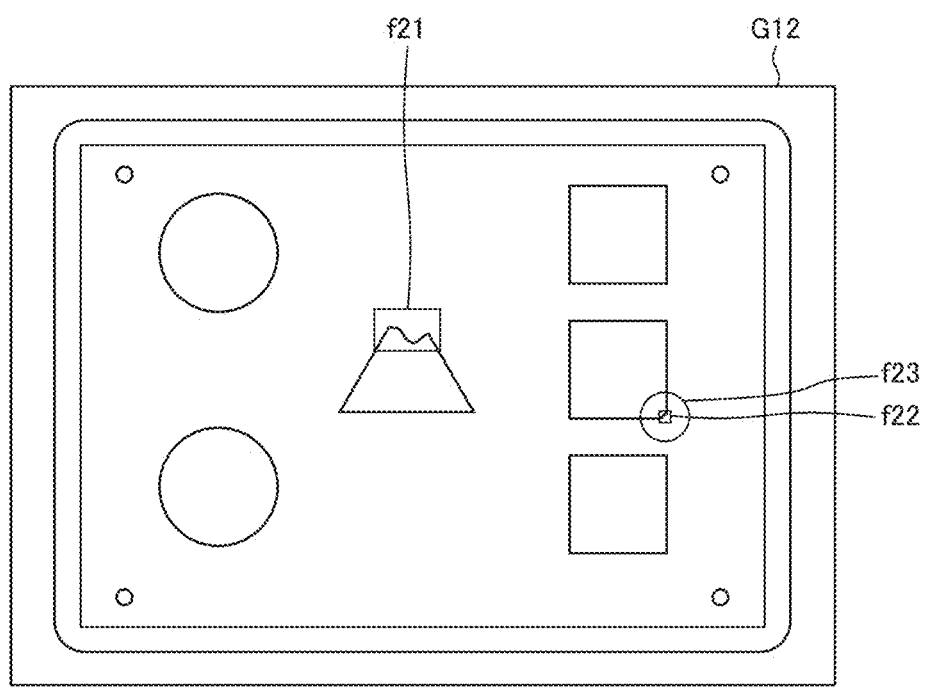
FIG. 9 is a view illustrating an example of a screen displayed on a display.

Next, a process in which a defect of a mold 2 is displayed, which process is carried out by the display control device 10 and the line controller 50, will be described with reference to the drawing. FIG. 8 is a flowchart illustrating an example of a flow of a defect display process carried out by the display control device 10 and the line controller 50. Note that some steps may be carried out in parallel or in a different order.

In step S101, the determining section 11 compares the captured image of the mold 2, which image has been captured by the inspecting device 20, with the reference image to determine the size of each of defects contained in the mold 2. The determining section 11 generates an inspection result image in which a marker determined according to the size of the determined defect is superimposed on the captured image, and stores the inspection result image in the inspection result table.

In the present embodiment, the identification information of the mold 2 in front of the operator in the core setting area A1 is grasped by the line control 50 because of its position in relation to the core setting area A1. The display control device 10 causes an image of the inspection result of the mold 2 in front of the operator in the core setting area A1 to be displayed on the display 31 in the core setting area A1. To do so, the line controller 50 transmits, to the display control device 10, the identification information of the mold 2 so that the display control device 10 reads the inspection image of the mold 2 in front of the operator in the core setting area A1.

In step S102, the line controller 50 determines the mold 2 for which the inspection result is to be displayed. For example, the line controller 50 determines a mold 2 located at a specific position to be the mold 2 for which the inspection result is to be displayed. The specific position is, for example, a position corresponding to the core setting area A1. Note that a method of determining the mold 2 for which the inspection result is to be displayed is not limited to the method described above. The line controller 50 transmits, to the display control device 10, the identification information of the determined mold 2.

The display control device 10 receives the identification information from the line controller 50. The determining section 11 of the display control device 10 determines the mold 2 corresponding to the received identification information to be the mold 2 for which the inspection result is to be displayed.

In step S103, the determining section 11 reads, from the auxiliary memory 103, the inspection result image (composite image for display) of the determined mold 2. In the present embodiment, the display control device 10 reads the inspection result image stored in the auxiliary memory 103 (composite image in which an object display is superimposed on a mold drop part on a captured image based on a difference obtained by comparison between the captured image and the reference image) based on the identification information from the line controller 50, and transmits that image data for display to the input/output device 30. The input/output device 30 causes that inspection result image to be displayed on the display 31.

In step S104, the display control section 12 causes the inspection result image to be displayed on the display such that each defect contained in the mold 2 is emphasized by a method which is determined according to the size of the defect which size has been determined by the determining section 11. Note that, respective inspection result images of a plurality of molds 2 may be displayed on the display 31. The method which is determined according to the size of the defect is, for example, a display method such that a defect image is changed in number, color, shape, position, size, or blinking pattern according to the size of the defect. In this embodiment, the display control section 12 causes the defect figure of a size equivalent to the size of the defect contained in the mold 2 to be displayed in the captured image of the mold 2 at a position corresponding to the position of that defect. The defect figure indicates at which position the defect has been detected and how large the detected defect is.

Further, in this embodiment, the display control section 12 changes the method of displaying a defect image (a defect figure, a marker, etc.) depending on whether the size of a defective part is not greater than a threshold value. More specifically, the display control section 12 performs display to emphasize the defect by superimposing, on the captured image, the defect figure indicating the defect and superimposing, on the captured image, the marker indicating the defect of the size not greater than the threshold value.

FIGS. 9 to 12 are views illustrating examples of screens G12 to G15 displayed on the display 31. In the example illustrated in FIG. 9, the display control section 12 causes rectangular figures f21 and f22 of sizes equivalent to sizes of defects contained in the mold 2 to be displayed at positions corresponding to the positions of the defects. Further, for a defect of a size not greater than the threshold value, the display control section 12 displays a marker f23 which is a circular figure surrounding the defect.

Figure 10:
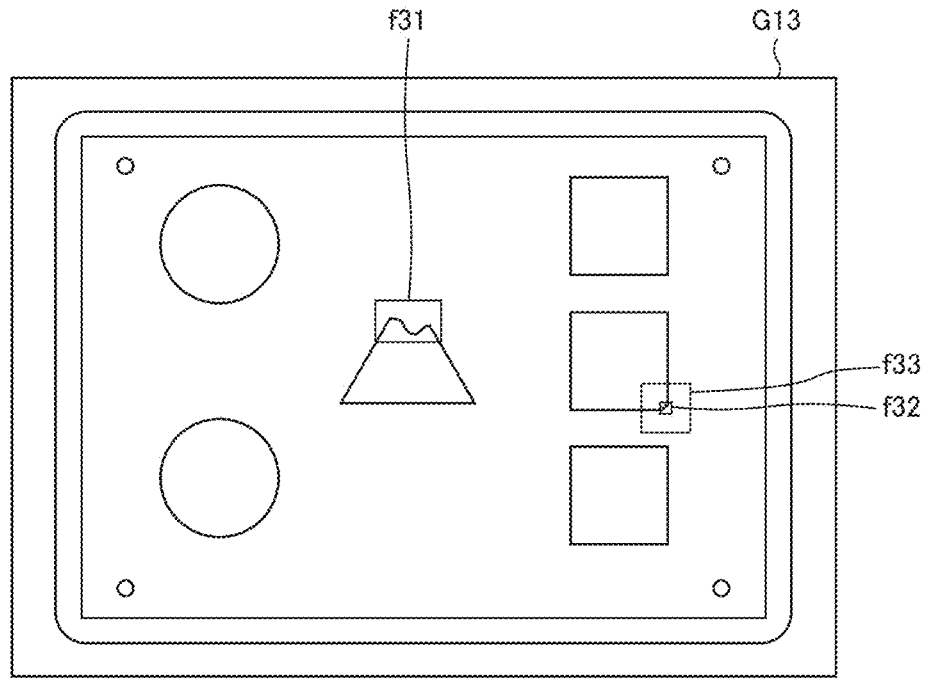
FIG. 10 is a view illustrating an example of a screen displayed on a display.

In the example illustrated in FIG. 10, the display control section 12 causes rectangular figures f31 and f32 of sizes equivalent to sizes of defects contained in the mold 2 to be displayed at positions corresponding to the positions of the defects. Further, for a defect of a size not greater than the threshold value, the display control section 12 displays a marker f32 which is a rectangular figure surrounding the defect.

Figure 11:
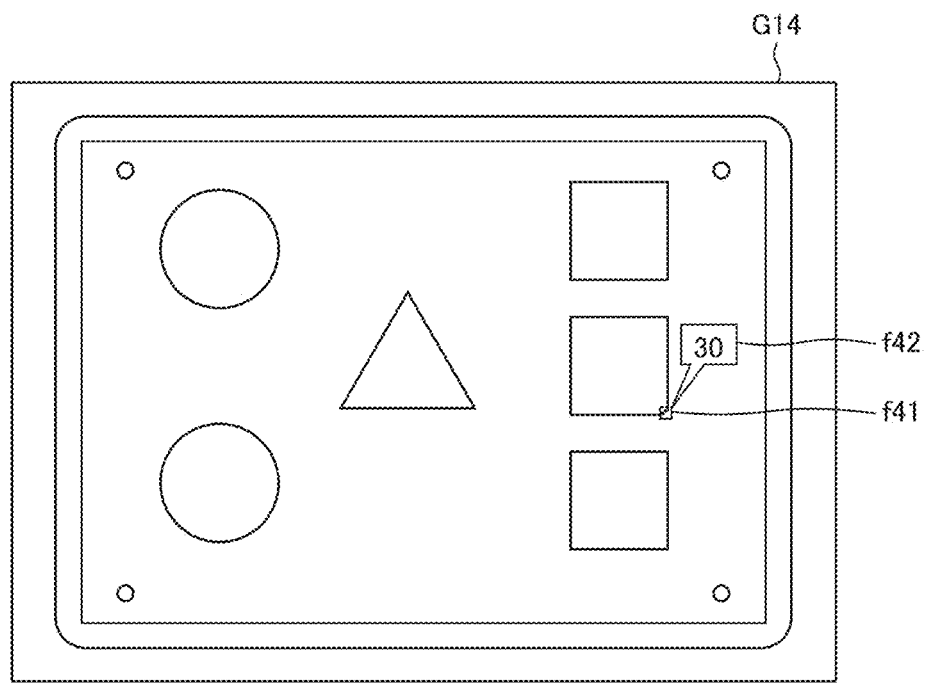
FIG. 11 is a view illustrating an example of a screen displayed on a display.

In the example illustrated in FIG. 11, the display control section 12 causes a rectangular figure f41 of a size equivalent to a size of a defect contained in the mold 2 to be displayed. Further, for a defect of a size not greater than the threshold value, the display control section 12 displays a marker f42 which is a balloon image indicating the defect.

Figure 12:
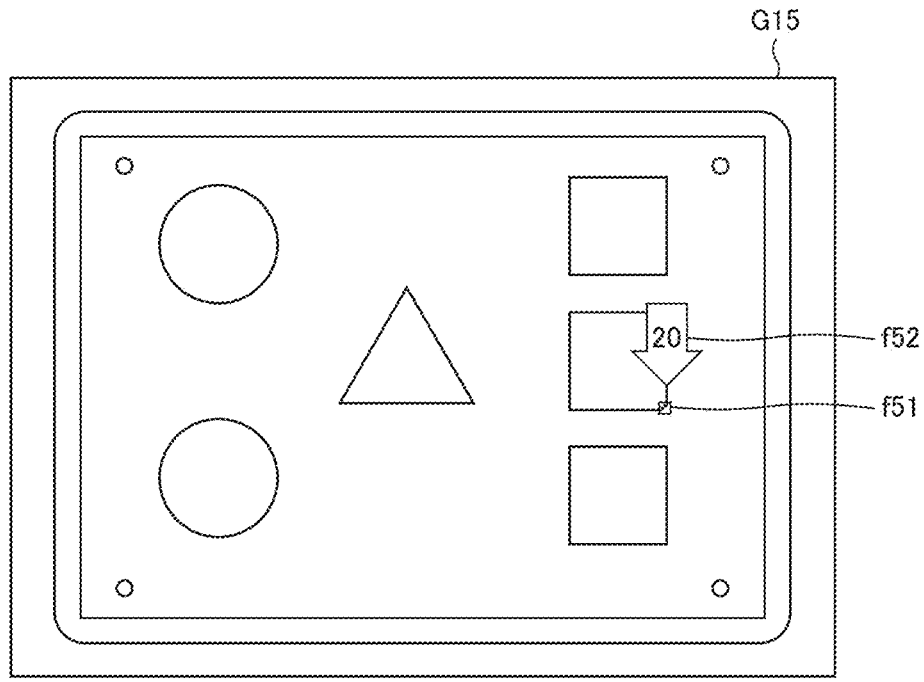
FIG. 12 is a view illustrating an example of a screen displayed on a display.

In the example illustrated in FIG. 12, the display control section 12 causes a rectangular figure f51 of a size equivalent to a size of a defect contained in the mold 2 to be displayed. Further, for a defect of a size not greater than the threshold value, the display control section 12 displays a marker f52 which is an arrow image indicating the defect. The marker f52 contains a numerical value indicating the size of a detected defective part.

Further, in this embodiment, the display control section 12 carries out a display process in which each of the defects is emphasized by superimposing, on the captured image, the defect figure indicating the defect, and a defect group, which consists of defects in close proximity to each other and of a size not greater than the threshold value, is emphasized by superimposing, on the captured image, the marker indicating the defect group.

Figure 13:
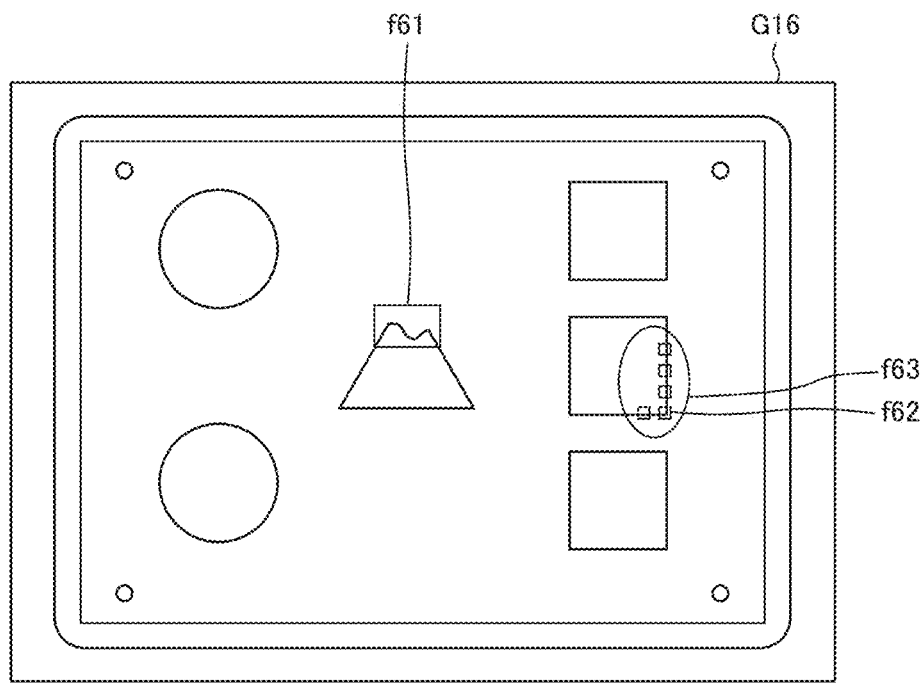
FIG. 13 is a view illustrating an example of a screen displayed on a display.

FIG. 13 is a view illustrating an example of a screen G16 displayed on the display 31. In the example illustrated in FIG. 13, the display control section 12 causes rectangular figures f61 and f62 of sizes equivalent to sizes of defects contained in the mold 2 to be displayed at positions corresponding to the positions of the defects. Further, the display control section 12 emphasizes a defect group, which consists of defects in close proximity to each other and of a size not greater than the threshold value, by superimposing, on the captured image, a marker f63 indicating the defect group. The marker f63 contained in the screen displayed on the display 31 allows an operator who sets cores or performs other task to easily grasp that the mold 2 has a plurality of small defects formed therein.

Incidentally, in the image-based mold drop evaluation made on a good/no good basis by the inspecting device 20, even a part which does not need to be regarded as no good (mold drop) (e.g., a part, called sprue runner, which will be separated from a casting product) may be regarded as no good, depending on the shape of the mold 2. In a case where such a negative evaluation result (no good) is taken over as is and pouring is not permitted, the yield in the entire line is reduced.

Conversely, relatively small defects of a mold which is regarded as good in the image-based mold drop evaluation made by the inspecting device 20 include an unacceptable defect that may cause a product failure of an actual casting product. In a case where a casting is produced by carrying out pouring into such a mold, a defective rate increases, and the yield in the entire line is reduced.

Therefore, a determination as to whether to carry out pouring into that mold needs to be made not only by image-based mechanical evaluation but also by final evaluation made by the operator through a visual check with reference to information on the image-based evaluation.

The operator in the casting line is basically present only in the core setting area A1 or around the pouring machine 60. In a current casting line, it is the operator in the core setting area A1 that can visually check a mold drop.

Meanwhile, the inspecting device 20 for making the image-based mold drop evaluation carries out image capture at a position slightly short of the core setting area A1, and then makes an evaluation on a good/no good basis. Thus, to display and present, to the operator in the core setting area A1, an image representing a result of evaluation (evaluation result) of a target mold 2 which is located in front of the operator, the image representing the evaluation result, which has been stored in advance, of the target mold 2 is retrieved from the inspection result table of the display control device 10 and is displayed on the display 31 at the point in time when the target mold 2 arrives at the core setting area A1, in response to the position control signal from the line controller 50.

While viewing the image displayed on the display 31, the operator in the core setting area A1 makes a visual check on an image of the target mold in front of the operator, particularly a part indicated as a mold drop (no good), and evaluates whether or not the no-good result of the image-based evaluation is taken over as is and whether pouring into the target mold would not cause any problem. The operator enters a result (good or no good) of the evaluation that he/she made by means of the operating section of the input/output device 30.

The operator's entry of the visual evaluation result may be made via two simple two buttons, via keys of a personal computer, or by voice input, or various input means known in the art can be employed. The operator in the core setting area A1 cannot spare much time for the entry of the result of the visual mold drop evaluation since the operator not only sets cores but also carries out various kinds of operations prior to the mold assembly. For this reason, it is preferable to be able to easily enter the visual evaluation result.

The visual evaluation result (good or no good) having been entered by the operator is transmitted to the line controller 50 and stored as the visual evaluation result in the mold management table.

Figure 14:
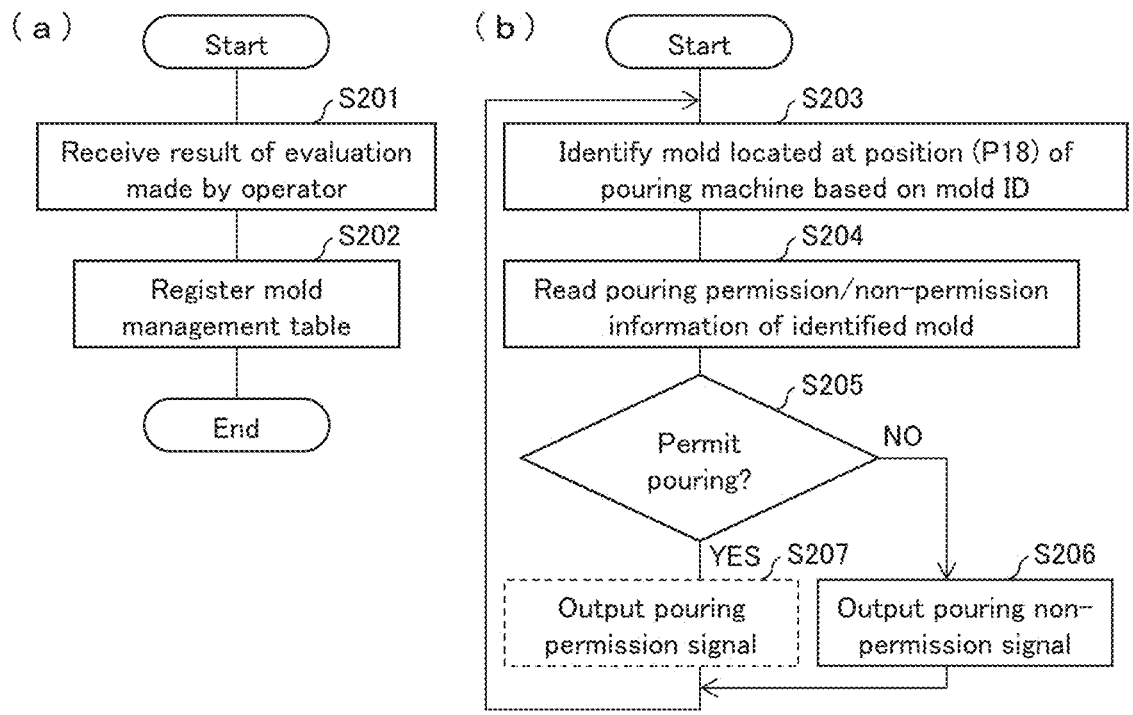
FIG. 14 is a flowchart illustrating an example of a flow of a process carried out by the line controller in accordance with Embodiment 1 of the present invention.

(a) of FIG. 14 illustrates a flowchart of a process of updating the mold management table in the line controller 50. Note that some steps may be carried out in parallel or in a different order.

In step S201, the line controller 50 receives, from the input/output device 30, information indicating a result (evaluation result) of evaluation made by the operator.

In step S202, the line controller 50 registers the received evaluation result in the mold management table.

As described above, when the evaluation result obtained by visual check by the operator who is present in the core setting area is updated by the line controller 50, the pouring permission/non-permission information for each mold is registered in the mold management table, as illustrated in FIG. 6.

Next, pouring control by the line controller 50 based on the mold management table in which the pouring permission/non-permission information has been updated and registered as described above will be described with reference to (b) of FIG. 14.

(b) of FIG. 14 is a flowchart illustrating pouring control over the pouring machine 60 by the line controller 50. Note that some steps may be carried out in parallel or in a different order.

In step S203, the line controller 50 identifies a mold 2 having arrived at the pouring machine 60 based on the mold ID.

In step S204, a pouring permission/non-permission signal for the mold 2 having arrived at the pouring machine 60 is read based on the mold ID, wherein the pouring permission/non-permission signal indicates whether or not to permit pouring into the mold.

In step S205, in a case where the pouring permission/non-permission signal indicates "pouring non-permission", the line controller 50 outputs a pouring non-permission signal to the pouring machine 60 (step S206). Upon receiving this "pouring non-permission" signal, the pouring machine 60 proceeds with the process without carrying out pouring into that mold.

On the other hand, in step S205, in a case where the pouring permission/non-permission signal indicates "pouring permission", the line controller 50 outputs a pouring permission signal to the pouring machine 60 (step S207). Note that, depending on the circumstances, the line controller 50 does not have to output a "pouring permission" signal to the pouring machine 60. This is realized by controlling the pouring machine 60 such that the pouring machine 60 carries out pouring into all of the molds having arrived at the pouring machine 60 unless the pouring machine 60 receives the "pouring non-permission" signal from the line controller 50, since the pouring machine 60 basically operates such that the pouring machine 60 ordinarily carries out pouring into all of the molds having arrived at the pouring machine 60.

In this way, the pouring machine 60 carries out pouring control over the mold 2 having arrived at the position of the pouring machine 60 based on the pouring permission/non-permission signal having been received from the line controller 50. In a case where the received pouring permission/non-permission signal indicates "permission" or where the pouring machine 60 receives no signal, the pouring machine 60 carries out pouring into the mold 2. On the other hand, in a case where the received pouring permission/non-permission signal indicates "non-permission", the pouring machine 60 does not carry out pouring into the mold 2.

In the present embodiment, the inspection result of the mold 2 conveyed along the conveyance path is displayed on the display 31. In so doing, in a case where the size of the defective part contained in the mold 2 is not greater than a threshold value, not only a rectangular figure indicating the defective part, but also a marker for emphasizing the defective part are displayed. The displayed marker allows the operator who sets cores or the like person to easily grasp the defective part even in a case where a defect contained in the mold 2 has a small size.

In Embodiment 1, the display control device 10 is configured as a device separate from the line controller 50. Alternatively, the line controller 50 may have the function of the display control device 10. That is, the line controller 50 and the display control device 10 may be configured as an integral device.

Embodiment 2

Another embodiment of the present invention is described below. This embodiment differs from Embodiment 1 described above in that the process in which a defect of a mold 2 is displayed (process in step S103 in FIG. 8), carried out by the display control device 10, is carried out in a different way. Note that, for convenience of explanation, members having functions identical to those of the respective members described in the above embodiment are given respective identical reference signs, and a description of those members is omitted here.

In this embodiment, the display control section 12 changes a method of displaying a rectangular figure indicating a defect, depending on whether the size of the defect is not greater than a threshold value. More specifically, for a defect of a size greater than the threshold value, the display control section 12 causes a rectangular figure of a size equivalent to the size of that defect to be displayed in the captured image at a position corresponding to the position of that defect. On the other hand, for a defect of a size not greater than the threshold value, the display control section 12 causes a rectangular figure of a size larger than that of that defect in the captured image to be displayed at a position corresponding to the position of that defect.

Figure 15:
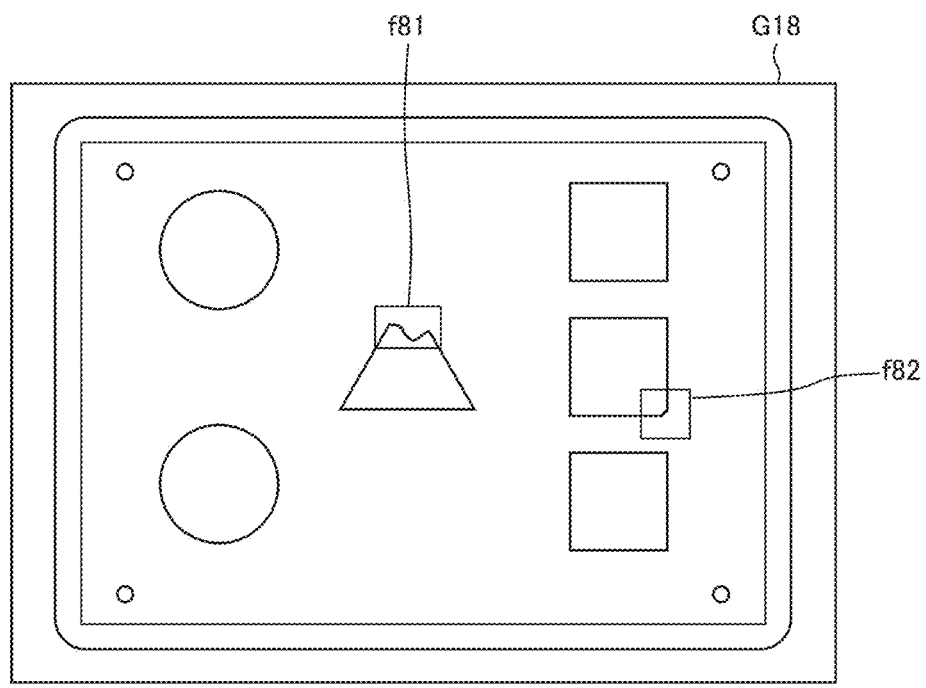
FIG. 15 is a view illustrating an example of a screen displayed on a display.

FIG. 15 is a view illustrating an example of a screen G18 displayed on the display 31. In the example illustrated in FIG. 15, for a defect of a size greater than the threshold value, the display control section 12 causes a rectangular figure f81 of a size equivalent to the size of that defect to be displayed at a position corresponding to the position of that defect. On the other hand, for a defect of a size not greater than the threshold value, the display control section 12 causes a rectangular figure of a size larger than that of that defect to be displayed at a position corresponding to the position of that defect.

Figure 16:
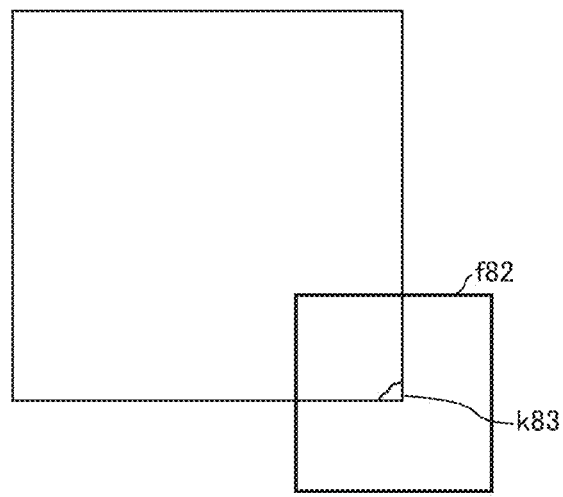
FIG. 16 is a view illustrating a size of a displayed rectangular figure and a size of an actual defect.

FIG. 16 is a view illustrating a size of a displayed rectangular figure and a size of an actual defect. In FIG. 16, a captured image obtained by image capture of an image of the mold 2 contains a defect k83. In this embodiment, the display control section 12 causes a rectangular figure f82 of a size larger than that of the defect k83 to be displayed at a position corresponding to the position of the defect k83.

In this embodiment, in a case where a size of a defective part contained in the mold 2 is not greater than the threshold value, a rectangular figure indicating the defective part is displayed with a size larger than that of the defective part in the captured image. This allows the operator who sets cores or the like person to easily grasp even a small-sized defective part contained in the mold 2.

As described above, in this embodiment, the display control section 12 displays a rectangular figure of a size larger than that of a defect and a rectangular figure of a size equivalent to the size of the defect. In so doing, the display control section 12 may cause the rectangular figure of the size larger than that of the defect and the rectangular figure of the size equivalent to the size of the defect to be displayed in mutually different manners. For example, the display control section 12 may cause the rectangular figure of the size larger than that of the defect and the rectangular figure of the size equivalent to the size of the defect to be displayed in mutually different colors. In this case, the operator or the like can easily grasp, from the colors of the rectangular figures displayed on the display 31, whether or not the size of the displayed rectangular figure is larger than the size of an actual defect.

Embodiment 3

Another embodiment of the present invention is described below. This embodiment differs from Embodiment 2 described above in that the process in which a defect of a mold 2 is displayed (process in step S103 in FIG. 8), carried out by the display control device 10, is carried out in a different way. Note that, for convenience of explanation, members having functions identical to those of the respective members described in the above embodiments are given respective identical reference signs, and a description of those members is omitted here.

In this embodiment, for a defect of a size greater than a threshold value, a rectangular figure of a size equivalent to the size of that defect is superimposed on the captured image at a position corresponding to the position of this defect. On the other hand, the display control section 12 carries out a display process in which a defect is emphasized by superimposing, on the captured image, an enlarged image obtained by enlarging a region containing a defect of a size not greater than the threshold value.

Figure 17:
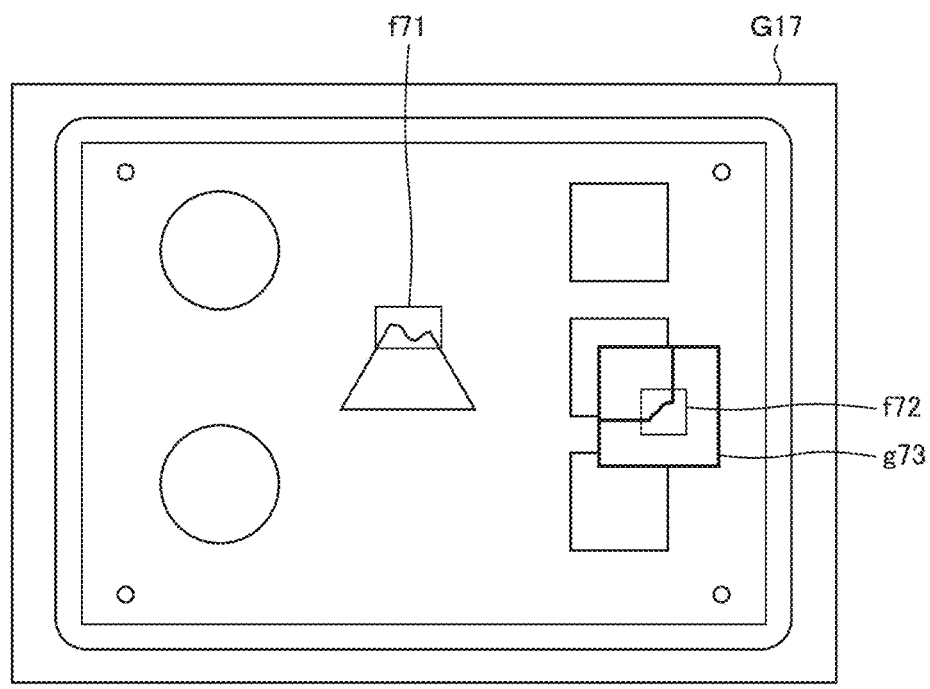
FIG. 17 is a view illustrating an example of a screen displayed on a display.

FIG. 17 is a view illustrating an example of a screen G17 displayed on the display 31. In the example illustrated in FIG. 17, for the defect of the size greater than the threshold value, the display control section 12 causes the rectangular figure f71 of the size equivalent to the size of that defect to be displayed at a position corresponding to the position of each defect. On the other hand, for the defect of the size not greater than the threshold value, the display control section 12 carries out a display process in which such a defect is emphasized by superimposing, on the captured image, an enlarged image g73 obtained by enlarging a region containing such a defective part. The enlarged image g73 may contain a rectangular figure f72 surrounding the defective part.

Further, in this embodiment, the display control section 12 carries out a display process in which a defect group, which consists of defects in close proximity to each other and of a size not greater than the threshold value, is emphasized by superimposing, on the captured image, an enlarged image obtained by enlarging a region containing the defect group.

In this embodiment, in a case where a size of a defective part contained in the mold 2 is small, an enlarged image obtained by enlarging a region containing the defective part is displayed so as to be superimposed on the captured image. This allows the operator who sets cores or the like person to easily grasp even a small-sized defective part contained in the mold 2.

Embodiment 4

Another embodiment of the present invention is described below. This embodiment differs from Embodiment 2 described above in that a screen indicating a defect of the mold 2 is displayed on a smart glass instead of the display 31. Note that, for convenience of explanation, members having functions identical to those of the respective members described in the above embodiments are given respective identical reference signs, and a description of those members is omitted here.

Figure 18:
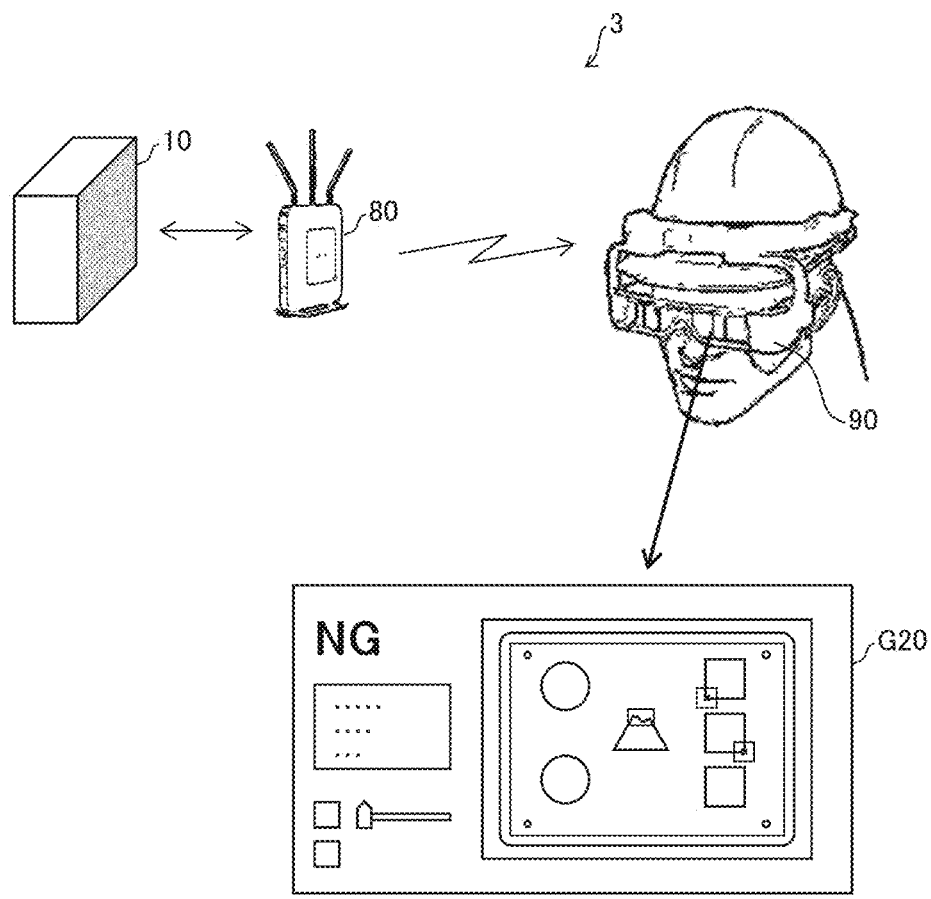
FIG. 18 is a diagram schematically illustrating a configuration of a display control system in accordance with Embodiment 4 of the present invention.

FIG. 18 is a view schematically illustrating a configuration of a display system 3 in accordance with Embodiment 5. The display system 3 includes a display control device 10, a wireless router 80, and a smart glass 90. The wireless router 80 is a communication device that relays wireless communications between the display control device 10 and the smart glass 90. In this embodiment, the display control device 10 includes a communication interface (not illustrated) that carries out wireless communications with the smart glass 90. The smart glass 90 is an augmented reality wearable computer of a head-mounted display type.

In this embodiment, the display control device 10 transmits data of a display screen to the smart glass 90 via the wireless router 80. The smart glass 90 displays a screen representing the defect of the mold 2 (for example, the screen G20 in FIG. 18). In so doing, on the smart glass 90, each defect is displayed so as to be emphasized by a method which is determined according to the size of the defect contained in the mold 2. The operator who is present in the core setting area A1 or the other area can grasp what defect is contained in the mold 2 by wearing the smart glass 90 and checking the screen displayed on the smart glass 90.

Embodiment 5

Figure 19:
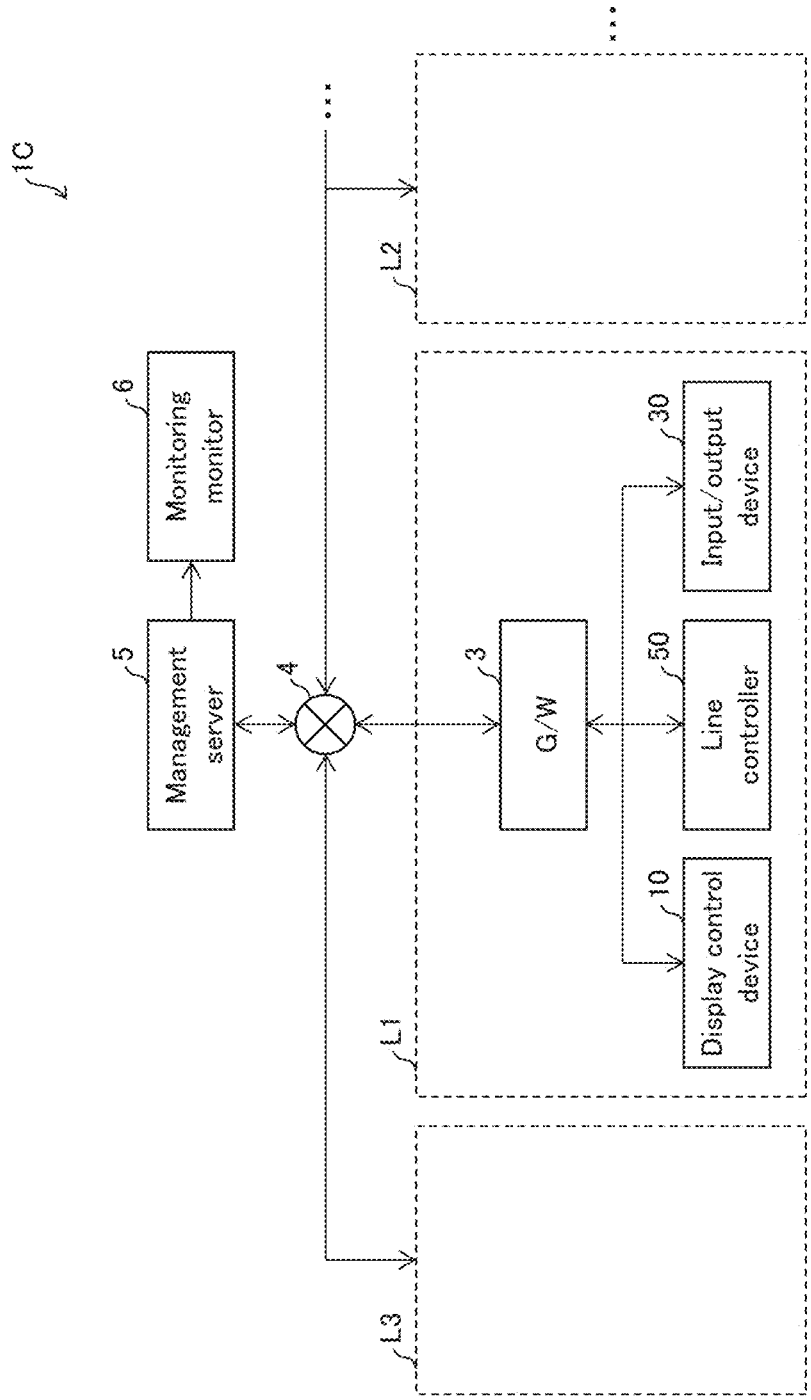
FIG. 19 is a diagram schematically illustrating a configuration of a casting system in accordance with Embodiment 5 of the present invention.

FIG. 19 is a diagram schematically illustrating a configuration of a molding system 1C in accordance with the present embodiment. In an example illustrated in FIG. 19, a plurality of casting lines L1, L2, L3, . . . are provided together in one factory. Each of the casting lines L1, L2, L3, . . . includes the casting system 1 illustrated in FIG. 2. Particularly, each of the casting lines L1, L2, L3, . . . includes a display control device 10, an input/output device 30, a line controller 50, and a gateway GW. The display control device 10, the input/output device 30, and the line controller 50 are similar to those in Embodiment 2 described above.

Data stored in the display control device 10, data stored in the line controller 50, data stored in the input/output device 30 are integrated, organized, and managed in the management server 5 of the factory through the gateway GW and the network 4.

A state of the integrated and managed data in the management server 5 is displayed as traceability data including current data or past data on a monitoring monitor 6 of, for example, a personal computer (PC) for factory management or a mobile terminal for factory management. The data displayed on the monitoring monitor 6 include operating statuses of the individual lines, occurrence status of mold drops (a failure rate, etc.), analyzed failure causes, advice on measures, and others. For example, in addition to a total failure rate in each of the lines in the factory, the presence or absence of mold drops, and when a mold drop has occurred in which of the lines are graphically displayed.

As for information indicative of the occurrence of a mold drop, other information on the mold 2 are also displayed, including, for example, external information such as sand property data on the mold 2, control data during mold formation, mold strength determination result data, an ambient temperature, and a temperature, and an actual inspection result image.

The traceability data can be used, for example, to display a past failure rate and a failure incidence rate of mold drops in a total number of failures and to provide advice on measures.

Embodiment 6

Figure 20:
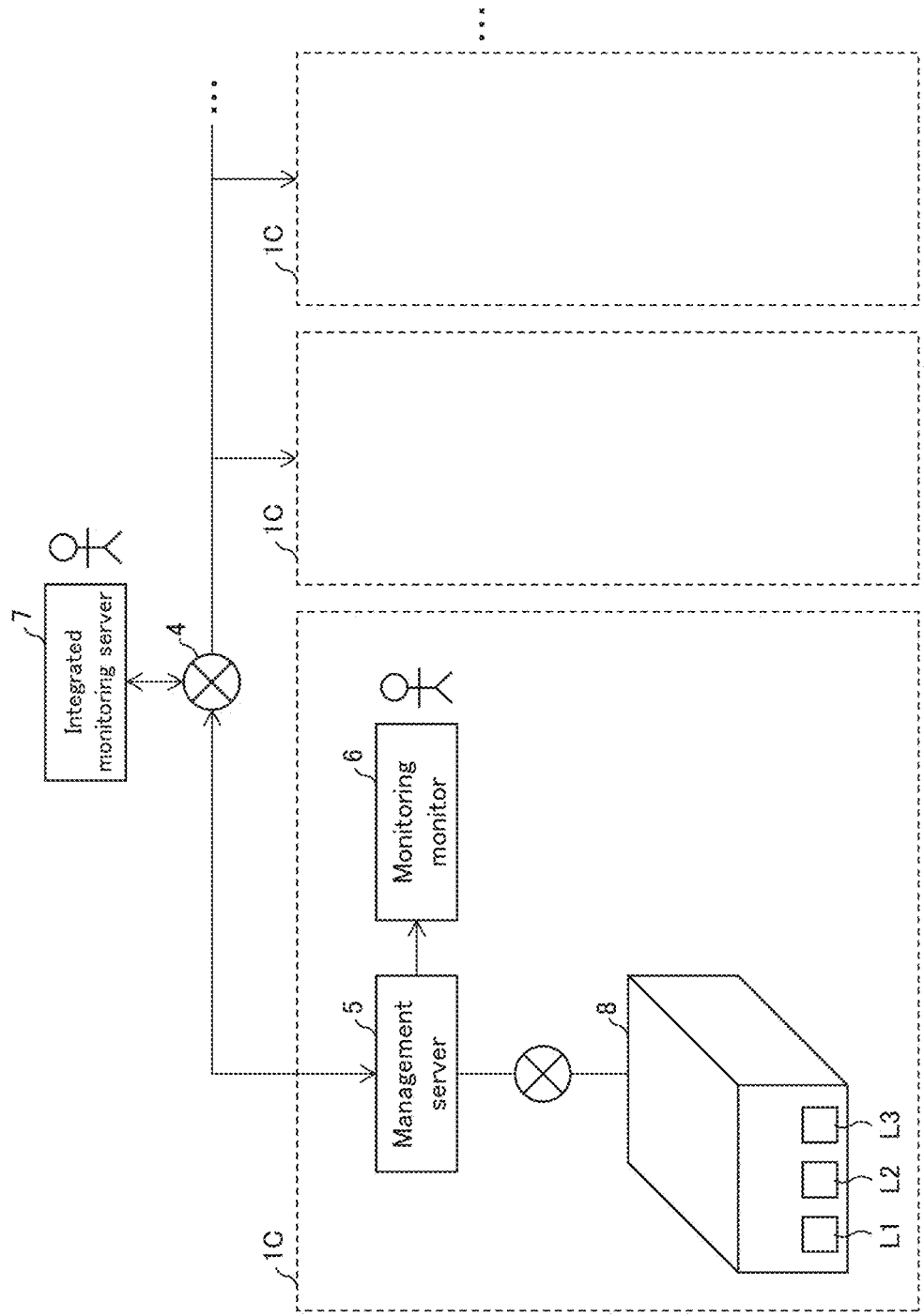
FIG. 20 is a diagram schematically illustrating a configuration of a casting system in accordance with Embodiment 6 of the present invention.

FIG. 20 is a diagram schematically illustrating a casting system 1D in accordance with the present embodiment. The casting system 1D includes a plurality of casting systems 1C each including a plurality of casting lines in one factory 8. In each of the casting systems 1C, management is carried out for each casting line. The casting systems 1C include their respective management servers 5 which are connected to an integrated monitoring server 7 via a network 4. The integrated monitoring server 7 receives data from the plurality of management servers 5 and organizes and manages the data.

The present embodiment enables monitoring of a plurality of factories each including a plurality of lines. In this case, the management of the individual factories is similar to that in Embodiment 5 described above.

In the management of multiple factories, various data organized and stored in the integrated monitoring server 7 in each factory are collected in the management server 5 of each factory 8 via the network 4. The various data thus collected are organized and stored so that a failure rate and occurrence status of mold drops can be monitored, for example, through the screen in each factory 8, as in Embodiment 5.

[Variations]

In Embodiment 2 described above, in a case where the size of a defect contained in a mold 2 is not greater than a threshold value, the display control section 12 carries out a display process in which a marker indicating the defect (defect image) is superimposed on a captured image. The display method determined according to the size of a defect is not limited to the method presented in the above-described embodiment. The display control section 12 may change the color, shape, position, size, or blinking pattern of the defect image, which represents the defect, depending on the size of the defect represented by the defect image or the size of each defect contained in the defect group. For example, the display control section 12 may carry out control such that the color of the defect image to be displayed is changed according to the size of the defect. Further, for example, the display control section 12 may change the color of the defect image depending on whether or not the shape of the defect contained in the mold 2 satisfies a predetermined condition. Still further, for example, in a case where the size of the defect contained in the mold 2 satisfies a predetermined condition, the display control section 12 may carry out control such that the defect image corresponding to that defect is displayed in the screen at a conspicuous position (for example, in the center of the screen), not at a position corresponding to the position of that defect. Yet further, for example, in a case where the size of the defect contained in the mold 2 satisfies a predetermined condition, the display control section 12 may carry out control such that the size of the defect image is increased, the defect image is blinked, or the shape of the defect image is made different from the shape of other defect image(s).

Incidentally, in a case where the inspecting device 20 is a device that detects a small-sized mold drop as well, the inspecting device 20 may detect that a mold drop has occurred in a mold 2 which does not actually need to be evaluated as having a mold drop. In such a case, the operator finally makes a visual check and evaluates whether or not a mold drop has occurred in the mold 2. According to this aspect, for example, in a case where a defect image having a color which is determined according to the size of the defect is displayed on the display 31, the operator can easily grasp, from the color of the defect image, whether or not the defect (mold drop) needs to be evaluated through a visual check.

In Embodiment 4 described above, the display control section 12 carries out a display process in which an enlarged image obtained by enlarging a region containing a defect of a size not greater than a threshold value is superimposed on a captured image. The enlarged image display method which is determined according to the size of a defect is not limited to the method presented in the above-described embodiment. The display control section 12 may change the color, shape, position, size, or blinking pattern of the enlarged image, which indicates the defect, according to the size of the defect contained in the enlarged image or the size of each defect contained in the defect group. For example, the display control section 12 may carry out control such that the color of the enlarged image to be displayed is changed according to the size of the defect. Further, for example, the display control section 12 may change the color of the enlarged image depending on whether or not the shape of the defect contained in the mold 2 satisfies a predetermined condition. Still further, for example, in a case where the size of the defect contained in the mold 2 satisfies a predetermined condition, the display control section 12 may carry out control such that the enlarged image corresponding to that defect is displayed in the screen at a conspicuous position (for example, in the center of the screen), not at a position corresponding to the position of that defect. Yet further, for example, in a case where the size of the defect contained in the mold 2 satisfies a predetermined condition, the display control section 12 may carry out control such that the size of the enlarged image is increased, the enlarged image is blinked, or the shape of the enlarged image is made different from the shape of other enlarged image(s).

In Embodiment 2 described above, the display control device 10 carries out a display process in which a defect is emphasized by superimposing, on a captured image obtained by image capture of a mold 2, a defect image representing the defect. The display process carried out by the display control device 10 is not limited to the method presented in the above-described embodiment. For example, the display control device 10 may carry out display such that the defect image is superimposed on a reference image which is a target for comparison with the captured image in the inspection process. Further, the display control device 10 may carry out a display process in which only the defect image representing the defect (for example, only an enlarged image of a region containing a defective part) is displayed, without carrying out a superimposition process.

In Embodiment 2 described above, the case where the display 31 is installed in the core setting area A1 has been described. The display 31 may be installed in a place other than core setting area A1. The display 31 is installed, for example, in a downstream step at a destination place of the mold 2 to be inspected. The display 31 may be installed, for example, at a place where pouring is carried out by the pouring machine 60. Further, the display 31 may be installed in a place different from the casting line, for example, in a management office, a control room, or an inspection area of the casting system 1.

Further, in the embodiment described above, the display control device 10 displays, on the display 31, the inspection result of the mold 2 conveyed along the conveyance path. The display control device 10 may display, on the display 31 and in real time, the inspection result of the mold 2 being conveyed or may display a past inspection result on the display 31. In a case where the past inspection result is displayed, the display control device 10, for example, reads the inspection result from the inspection result table, and displays the read inspection result on the display 31 which is installed in the management office, the control room, or the inspection area. In so doing, the display control device 10 may, for example, display, on the display 31, not only the inspection result, but also information indicative of a date and time of inspection and identification information that identifies a mold 2.

In each of the embodiments described above, the configuration used in a case where each defect is displayed so as to be emphasized by the method which is determined according to the size of a defect contained in a mold 2 has been described. The display control device in accordance with the present invention can also be applied to a system other than the systems presented in the above-described embodiments. For example, the display control device in accordance with the present invention may be configured such that each defect is displayed so as to be emphasized by a method which is determined according to the size of a defect contained in a casting which has been produced with use of a mold and has been inspected for defects.

The functions implemented by the display control device 10 in the above-described embodiments may be shared and implemented by a plurality of devices. For example, at least part of the functions of the display control device 10 in accordance with Embodiment 2 described above may be implemented on a server in the cloud. In this case, the display control device 10 in accordance with Embodiment 2 described above is realized by communications between the display control device 10 and the server via a network.

In this case, to serve as a mold drop detecting deice, the server not only has the function of arithmetic operation and the function of image data storage, but also analyzes a link between a mold drop and data on sand properties and data during mold formation to prevent the occurrence of a mold drop and provides advice on measures or the like.

The server accumulates, for example, data relating to the inspection of a mold 2 and analysis data obtained from the devices on the lines. The data relating to the inspection of a mold 2 is, for example, an image captured by the inspecting device 20 and a reference image used for the inspection, a composite image in which a mold drop part is marked on an inspection result image, and parameters relating to the inspection process. The analysis data are, for example, sand properties before mold formation (CB, moisture, sand temperature, compressive strength, air permeability, etc.), control data during the mold formation (aeration waveform, squeeze pressure waveform, application quantity of a mold release agent, etc.), measured data of the mold strength after the mold formation, and environmental data of the factory (ambient temperature, humidity, etc.). The analysis data on the line is stored in association with inspection data.

Functions provided by the server are, for example, tracking of past failure occurrences (visualization by year, by month, by day or by product, etc.), and prediction of a failure rate and provision of advice on measures based on past accumulated data.

In the embodiment described above, the case where the display control device 10 determines the size of the defect as a feature amount of the defect has been described. The feature amount of the defect may be a feature amount other than the size of the defect. The feature amount of the defect is information representing the feature of the defect such as an appearance, state, or the like of the defect. Such information is, for example, information indicative of the size or position of the defect. Displaying by the method which is determined according to the feature amount means, for example, displaying in such a manner that an appearance of an image representing a defect (hereinafter referred to as "defect image") is changed depending on the feature amount of each of the defects. For example, in a case where the feature amount of the defect is the position of the defect, the display control device 10 may change the color, shape, position, size, or blinking pattern of the marker or enlarged image depending on whether the position of the defect is contained in the cavity which defines the shape of a casting or in the sprue runner for guiding molten metal to the cavity.

[Example of Configuration Achieved by Software]

Control blocks of the display control device 10, the inspecting device 20, the input/output device 30, and the line controller 50 (particularly, the determining section 11 and the display control section 12) can be realized by a logic circuit (hardware) provided in an integrated circuit (IC chip) or the like. Alternatively, control blocks of the display control device 10, the inspecting device 20, the input/output device 30, and the line controller 50 can be realized by software.

In the latter case, the display control device 10, the inspecting device 20, the input/output device 30, and/or the line controller 50 each includes a computer that executes instructions of a program that is software realizing the foregoing functions. The computer includes, for example, at least one processor. The computer also includes at least one computer-readable storage medium in which the program is stored. An object of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a RAM or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

[Remarks]

The present invention is not limited to the embodiments, but can be altered within the scope of the claims. The present invention also encompasses, in its technical scope, any embodiment derived by combining technical means included in differing embodiments.

Aspects of the present invention can also be expressed as follows:

In order to solve the above-described problem, a display control device in accordance with Aspect 1 of the present invention includes a controller, the controller configured to carry out: a determination process in which a feature amount of each of defects contained in a mold is determined with reference to an image obtained by image capture of a mold; and a display process in which the image is displayed on a display such that each of the defects contained in the mold is emphasized by a method which is determined according to the feature amount, determined in the determination process, of each of the defects contained in the mold.

With the above configuration, in displaying an image obtained by image capture of a mold on the display, the display control device displays, on the display, an image in which a defect contained in the mold is emphasized by the method which is determined according to the feature amount of the defect. Thus, the image displayed on the display allows the operator to easily grasp what defect is contained in the mold.

In Aspect 1 of the present invention, a display control device in accordance with Aspect 2 of the present invention may be arranged such that the feature amount, determined in the determination process, of each of the defects includes at least a size of each of the defects, and in the display process, the controller causes each of the defects to be emphasized by superimposing, on the image, a defect figure indicating each of the defects and superimposing, on the image, a marker indicating the defect of the size not greater than a threshold value.

With the above configuration, even in a case where the size of the defect is small, the marker indicating the defect in the displayed image allows the operator to easily grasp what defect is contained in the mold.

In Aspect 1 of the present invention, a display control device in accordance with Aspect 3 of the present invention may be arranged such that the feature amount, determined in the determination process, of the defect includes at least a size of the defect and a position of the defect, and in the display process, the controller causes a defect group, which consists of defects in close proximity to each other and of a size not greater than a threshold value, to be emphasized by superimposing, on the image, a defect figure indicating each of the defects and superimposing, on the image, a marker indicating the defect group.

With the above configuration, even in a case where small defects are contained in the mold, the marker indicating the defect group allows the operator to easily grasp a place where the small defects are gathered.

In Aspect 2 or 3 of the present invention, a display control device in accordance with Aspect 4 of the present invention may be arranged such that in the display process, the controller changes a color, shape, position, size, or blinking pattern of the marker, which represents the defect, according to the feature amount of the defect indicated by the marker or the feature amount of each of the defects contained in a defect group.

With the above configuration, the color, shape, position, size, or blinking pattern of the displayed marker allows the operator to easily grasp the defect contained in the mold.

In Aspect 1 of the present invention, a display control device in accordance with Aspect 5 of the present invention may be arranged such that the feature amount, determined in the determination process, of each of the defects includes at least a size of each of the defects, and in the display process, the controller causes the defects to be emphasized such that, for a defect of a size greater than a threshold value, a defect figure of a size equivalent to the size of the defect is superimposed on the image, and an enlarged image obtained by enlarging a region containing a defect of a size not greater than the threshold value is superimposed on the image.

With the above configuration, even in a case where the size of the defect is small, the enlarged image obtained by enlarging the region containing the defect allows the operator to easily grasp what defect is contained in the mold.

In Aspect 1 of the present invention, a display control device in accordance with Aspect 6 of the present invention may be arranged such that the feature amount, determined in the determination process, of each of the defects includes at least a size of each of the defects and a position of each of the defects, and in the display process, the controller causes the defects to be emphasized such that, for a defect of a size greater than a threshold value, a defect figure of a size equivalent to the size of the defect is superimposed on the image, and an enlarged image obtained by enlarging a region containing a defect group is superimposed on the image, the defect group consisting of defects in close proximity to each other and of a size not greater than a threshold value.

With the above configuration, even in a case where small defects are contained in the mold, the enlarged image obtained by enlarging the region containing the defect group allows the operator to easily grasp a place where the small defects are gathered.

In Aspect 5 or 6 of the present invention, a display control device in accordance with Aspect 7 of the present invention may be arranged such that the controller changes the color, shape, position, size, or blinking pattern of the enlarged image according to the feature amount of the defect contained in the enlarged image or according to the feature amount of each of the defects contained in a defect group.

With the above configuration, the color, shape, position, size, or blinking pattern of the displayed enlarged image allows the operator to easily grasp the defect contained in the mold.

In Aspects 1 to 7 of the present invention, a display control device in accordance with Aspect 8 of the present invention may be arranged such that the controller includes: at least one processor configured to carry out each of the foregoing processes in accordance with a predetermined program; and at least one memory storing the program.

With the above configuration, in displaying an image obtained by image capture of a mold on the display, the display control device displays, on the display, an image in which a defect contained in the mold is emphasized by the method which is determined according to the feature amount of the defect. Thus, the image displayed on the display allows the operator to easily grasp what defect is contained in the mold.

A computer-readable non-transitory storage medium in accordance with Aspect 9 of the present invention stores a control program for controlling the display control device described in Aspect 1, the control program causing the controller to carry out each of the foregoing processes.

The present invention also encompasses a control program for controlling the display control device described in Aspect 1 and a computer-readable non-transitory storage medium in which the control program is stored.

REFERENCE SIGNS LIST 1 casting system
2 mold
3 display system
10 display control device
11 determining section
12 display control section
20 inspecting device
21 sensor
30 input/output device
31 display
40 molding machine
50 line controller
60 pouring machine
70 conveying device
80 wireless router
90 smart glass
101 processor
102 main memory
103 auxiliary memory
104 input interface
105 output interface
A1 core setting area
f21, f31, f41, f51, f61, f71, f72, f81, f82 rectangular figures
f23, f32, f42, f52, f63 markers
G12, G16, G17, G18, G20 screens
g73 enlarged image
k83 defect
P1, P18, P19, P2, P3, P5, P6, P9 positions

The invention claimed is:

1. A display control device comprising:
a controller,
the controller being configured to carry out
a determination process in which a feature amount of each defect contained in a mold is determined based on an image of the mold, the image being obtained by image capture of the mold; and
a display process in which the image is displayed on a display such that each defect contained in the mold is emphasized, each defect being emphasized by a method determined based on the feature amount, determined in the determination process, of each defect contained in the mold.

2. The display control device according to claim 1, wherein
the feature amount, determined in the determination process, of each defect includes at least a size of the defect, and
in the display process, the controller is configured to cause each defect to be emphasized by superimposing, on the image, a defect figure indicating each defect and superimposing, on the image, a marker indicating each defect having a size not greater than a threshold value.

3. The display control device according to claim 2, wherein
in the display process, the controller is configured to change at least one of a color, a shape, a position, a size, or a blinking pattern of the marker, which represents the defect, based on the feature amount of the defect indicated by the marker or the feature amount of each defect included in a defect group.

4. The display control device according to claim 1, wherein
the feature amount, determined in the determination process, of each defect includes at least a size of the defect and a position of the defect, and
in the display process, the controller is configured to cause each defect to be emphasized by superimposing, on the image, a defect figure indicating each of the defects, and
a defect group, which includes defects in close proximity to each other and having a size not greater than a threshold value, to be emphasized by superimposing, on the image, a marker indicating the defect group.

5. The display control device according to claim 1, wherein
the feature amount, determined in the determination process, of each defect includes at least a size the defect, and
in the display process, the controller is configured to cause each defect to be emphasized such that, for each defect having a size greater than a threshold value, a defect figure having a size equivalent to the size of the defect is superimposed on the image, and an enlarged image obtained by enlarging a region including a defect having a size not greater than the threshold value is superimposed on the image.

6. The display control device according to claim 5, wherein
the controller is configured to change at least one of a color, a shape, a position, a size, or a blinking pattern of the enlarged image based on the feature amount of the defect included in the enlarged image or based on the feature amount of each defect included in a defect group.

7. The display control device according to claim 1, wherein
the feature amount, determined in the determination process, of each defects includes at least a size of the defects and a position of the defects, and
in the display process, the controller is configured to cause each defect to be emphasized such that, for each defect having a size greater than a threshold value, a defect figure of a size equivalent to the size of the defect is superimposed on the image, and an enlarged image obtained by enlarging a region containing a defect group is superimposed on the image, the defect group including defects in close proximity to each other and having a size not greater than the threshold value.

8. The display control device according to claim 1, wherein the controller comprises:

at least one processor configured to carry out the determination process and the display process in accordance with a program; and at least one memory storing the program.

9. A computer-readable non-transitory storage medium storing a control program for controlling the display control device recited in claim 1, the control program being configured to cause the controller to carry out the determination process and the display process.

* * * * *